(12) United States Patent
Chihara et al.

(10) Patent No.: US 6,714,233 B2
(45) Date of Patent: Mar. 30, 2004

(54) MOBILE VIDEO TELEPHONE SYSTEM

(75) Inventors: Hiroyuki Chihara, Suwa (JP); Teruhiko Fujisawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/886,677

(22) Filed: Jun. 20, 2001

(65) Prior Publication Data

US 2002/0068600 A1 Jun. 6, 2002

(30) Foreign Application Priority Data

Jun. 21, 2000 (JP) ........................................ 2000-186927

(51) Int. Cl.[7] .................................................. H04N 7/14
(52) U.S. Cl. ................................ 348/14.02; 348/14.01; 348/14.03; 455/566
(58) Field of Search .......................... 348/14.01, 14.02, 348/14.03, 14.04, 14.05, 14.07; 455/41, 566, 568; 379/110.01, 102.03; H04N 7/14

(56) References Cited

FOREIGN PATENT DOCUMENTS

| JP | 9-321843 | 12/1997 | | |
|---|---|---|---|---|
| JP | 409327007 A | * 12/1997 | ............ | H04N/7/14 |
| JP | 10-136123 | 5/1998 | | |
| JP | 411205443 A | * 7/1999 | ............ | H04M/1/72 |
| JP | 02000115299 A | * 4/2000 | ............ | H04M/1/00 |
| JP | 2000-349897 | 12/2000 | | |
| JP | 2000-354106 | 12/2000 | | |
| JP | 2001-16653 | 1/2001 | | |
| JP | 2001-203997 | 7/2001 | | |

OTHER PUBLICATIONS

Rydbeck; Radiotelephone . . . a wireless handset; Dec. 22, 1994, WO 94/29966.*

* cited by examiner

*Primary Examiner*—Melur Ramakrishnaiah
(74) *Attorney, Agent, or Firm*—Michael T. Gabrik

(57) ABSTRACT

A mobile telephone device effects the image and voice communication with the other party of communication through a network. The mobile telephone device transmits the voice received from the other party, to a headset having a voice input/output unit by local radio communication, and receives by local radio communication and transmits to the other party the voice received from the headset. Also, the mobile telephone device transmits the image received from the other party to a wearable radio communication device having an imaging unit and a display unit by local radio communication, and receives by local radio communication and transmits to the other party the image from the wearable radio communication device. The wearable radio communication device receives an image from the mobile telephone device by local radio communication and displays it on the display unit, and picks up an image by the imaging unit and transmits it to the mobile telephone device by local radio communication. The headset receives the voice from the mobile telephone device by local radio communication and outputs it from the voice input/output unit while at the same time transmitting the voice input through the voice input/output unit, to the mobile telephone device by local radio communication.

23 Claims, 16 Drawing Sheets

MOBILE VIDEO TELEPHONE SYSTEM

TECHNICAL FIELD

The present invention relates to a mobile TV telephone system (hereinafter referred to as the mobile videophone system) comprising a wearable radio communication device portable by being worn on a finger, an arm or the neck of the user and a mobile telephone device, and a mobile videophone system further comprising a headset.

BACKGROUND ART

With the recent progress of the techniques related to the mobile telephone, the ownership and the use of what is called the mobile videophone is expected to extend in the near future. A simple mobile telephone device capable of transmitting/receiving a still image or an image sequence at the rate of several frames per second is already available.

The mobile telephone device of this type includes a voice communication unit, an imaging unit and a display unit built in its body. In order to view the image received from the other party displayed on the display unit of the mobile telephone device, therefore, the user of the mobile telephone device is required to place the mobile telephone device at a distance from his head. Also when picking up an image of the surrounding landscape or a person by the imaging unit and sending it to the other party, the user is required to place the mobile telephone device at a distance from his head. In the speech made using a mobile telephone device placed at a distance from his head, the user is required to speak loudly.

For making speech with an ordinary pitch of the voice, on the contrary, the user is required to attach the mobile telephone device closely to his ear or mouth. In such a case, however, the user cannot view the image of the other party displayed on the display unit of the mobile telephone device nor can he pick up the image of the surrounding scene with the imaging unit of the mobile telephone device.

As described above, the conventional mobile telephone device has the problem that the image of the other party cannot be checked at the same time as the speech or picking up the image of the surrounding scene.

DISCLOSURE OF THE INVENTION

The object of the present invention is to provide a mobile videophone system in which the user of a mobile telephone device can check the image of the other party and pick up the image of the surrounding scene while at the same time making speech with the other party, a method of communication using the system, and a wearable radio communication device, a mobile telephone device and a headset making up the system.

In order to achieve this object, the present invention provides a mobile videophone system comprising a mobile telephone device and a wearable radio communication device, wherein the mobile telephone device includes a communication unit, a voice input/output unit, a first local radio communication unit for effecting local bi-directional radio communication with the wearable radio communication device, and a first control unit for causing the communication unit to effect image and voice communication with the other party through a network, causing the voice received from the other party to be output from the voice input/output unit, causing the voice input through the voice input/output unit to be transmitted to the other party by the communication unit, causing the image received from the other party to be transmitted to the wearable radio communication device by the first local radio communication unit, and causing the image received from the wearable radio communication device to be transmitted to the other party, and wherein the wearable radio communication device includes a second local radio communication unit for effecting local bi-directional radio communication with the mobile telephone device, an imaging unit, a display unit, and a second control unit for causing the image received from the mobile telephone device by the second local radio communication unit to be displayed on the display unit, causing the image obtained by the imaging unit to be transmitted to the mobile telephone device by the second local radio communication unit, and causing an instruction for controlling the mobile telephone device to be transmitted by the second local radio communication unit.

With this system, the user can effect the bi-directional voice communication with the other party by means of the mobile telephone device and also the bi-directional image communication with the other party by means of the wearable radio communication device, and therefore can enjoy the videophone communication with the other party in a relaxed posture. Another advantage is that the mobile telephone device can be controlled conveniently by sending an instruction signal from the wearable radio communication device.

The present invention further provides a mobile videophone system comprising a mobile telephone device, a wearable radio communication device and a headset, wherein the mobile telephone device includes a communication unit, a first local radio communication unit for effecting local bi-directional radio communication with the wearable radio communication device and the headset, and a first control unit for causing the communication unit to effect image and voice communication with the other party through a network, causing the voice received from the other party to be transmitted to the headset by the first local radio communication unit, causing the voice received from the headset by the first local radio communication unit to be transmitted to the other party by the communication unit, causing the image received from the other party to be transmitted to the wearable radio communication device by the first local radio communication unit, and causing the image received from the wearable radio communication device by the first local radio communication unit to be transmitted to the other party, and wherein the wearable radio communication device includes a second local radio communication unit for effecting local bi-directional radio communication with the mobile telephone device, an imaging unit, a display unit, and a second control unit for causing the image received from the mobile telephone device by the second local radio communication unit to be displayed on the display unit, and causing the image obtained by the imaging unit to be transmitted to the mobile telephone device by the second local radio communication unit, and wherein the headset includes a third local radio communication unit for effecting bi-directional radio communication with the mobile telephone device, a voice input/output unit, and a third control unit for causing the voice received from the mobile telephone device by the third local radio communication unit to be output by the voice input/output unit, and causing the voice input through the voice input/output unit to be transmitted to the mobile telephone device by the third local radio communication unit.

With this system, even in the case where the mobile telephone device is put in a bag, for example, the user can make bi-directional speech with the other party by means of the headset and also can establish bi-directional image communication with the other party by means of the wearable radio communication device.

The present invention further provides a communication method wherein the mobile telephone device is such that the image and voice communication is effected with the other party through a network, the voice received from the other party is output from a voice input/output unit, the voice input through the voice input/output unit is transmitted to the other party, the image received from the other party is transmitted to a wearable radio communication unit having an imaging unit and a display unit by local radio communication, and the image is received by local radio communication from the wearable radio communication device and transmitted to the other party, and wherein the wearable radio communication device is such that an image is received from the mobile telephone device by local radio communication and displayed on the display unit, the image is picked up by the imaging unit and transmitted to the mobile telephone device by local radio communication, and an instruction signal for controlling the mobile telephone device is transmitted by local radio communication.

The present invention further provides a communication method wherein the mobile telephone device is such that the image and voice communication is effected with the other party through a network, the voice received from the other party is transmitted to a headset having a voice input/output unit by local radio communication, the voice is received from the headset by local radio communication and transmitted to the other party, the image received from the other party is transmitted to a wearable radio communication unit having an imaging unit and a display unit by local radio communication, and the image is received by local radio communication from the wearable radio communication device and transmitted to the other party, wherein the wearable radio communication device is such that an image is received from the mobile telephone device by local radio communication and displayed on the display unit, and an image is picked up by the imaging unit and transmitted to the mobile telephone device by local radio communication, and wherein the headset is such that a voice is received from the mobile telephone device by local radio communication and output from the voice input/output unit, and the voice input through the voice input/output unit is transmitted to the mobile telephone device by local radio communication.

In a preferred form, the mobile telephone device, with the arrival of an incoming call, establishes a first communication link for effecting local radio communication with the wearable radio communication device and a second communication link for effecting local radio communication with the headset, transmits an incoming call arrival announcing signal to the headset through the second communication link, and performs the processing for line connection with the other party upon receipt of an incoming call response instruction through the first communication link through the wearable radio communication device.

The present invention further provides a mobile telephone device comprising a communication unit, a voice input/output unit, a local radio communication unit for effecting local bi-directional radio communication including the image data communication with a wearable radio communication device having an imaging unit and a display unit, and a control unit for causing the communication unit to effect image and voice communication with the other party through a network, causing the voice received from the other party to be output from the voice input/output unit, causing the voice input through the voice input/output unit to be transmitted to the other party by the communication unit, causing the image received from the other party to be transmitted to the wearable radio communication device by the local radio communication unit, causing the image received from the wearable radio communication device to be transmitted to the other party by the communication unit, and causing a control operation to be performed by the local radio communication unit as instructed according to an instruction signal received from the wearable radio communication device.

The present invention further provides a mobile telephone device comprising a communication unit, a local radio communication unit for effecting local bi-directional radio communication with the wearable radio communication device having an imaging unit and a display unit and a headset having a voice input/output unit, and a control unit for causing the communication unit to effect image and voice communication with the other party through a network, causing the voice received from the other party to be transmitted to the headset by the local radio communication unit, causing the voice received from the headset by the local communication unit to be transmitted to the other party by the communication unit, causing the image received from the other party to be transmitted to the wearable radio communication device by the local radio communication unit, and causing the image received from the wearable radio communication device by the local radio communication unit to be transmitted to the other party by the communication unit.

In a preferred form, the control unit, with the arrival of an incoming call, establishes, by the local radio communication unit, a first communication link for effecting local radio communication with the wearable radio communication device and a second communication link for effecting local radio communication with the headset, sends an incoming call arrival announcing signal to the headset through the second communication link and, upon receipt of an incoming call response instruction through the first communication link from the wearable radio communication device, performs the processing for line connection with the other party.

The present invention further provides a wearable radio communication device comprising an imaging unit, a display unit, a local radio communication unit for effecting local bi-directional radio communication with a mobile telephone device, and a control unit for causing the image received from the mobile telephone device by the local radio communication unit to be displayed on the display unit, causing the image obtained by the imaging unit to be transmitted to the mobile telephone device by the local radio communication unit, and causing an instruction signal for controlling the mobile telephone device to be transmitted by the local radio communication unit.

In a preferred form, the wearable radio communication device further comprises a voice input/output unit, and the control unit outputs from the voice input/output unit the voice received from the mobile telephone device by means of the local radio communication unit and transmits the voice input through the voice input/output unit, to the mobile telephone device by means of the local radio communication unit.

In another preferred form, the wearable radio communication device comprises an operating unit and the control unit generates the instruction signal in accordance with the operation of the operating unit.

In this case, the control unit transmits the instruction signal for giving an instruction for access to the site in the network, to the mobile telephone device in accordance with the operation of the operating unit, and receives and displays on the display unit the response from the site through the mobile telephone device.

In still another preferred form, the control unit receives the information displayed on the display unit of the mobile telephone device from the mobile telephone device and displays it on the display unit of the wearable radio communication unit.

In yet another preferred form, the mobile telephone device can establish a first communication link for effecting local bi-directional radio communication with the wearable radio communication device and a second communication link for effecting local bi-directional radio communication with the headset having a voice input/output unit, and also can effect the bi-directional local radio communication including the voice data communication through the second communication link.

In this preferred form, for example, the mobile telephone device has the first repeating function for transmitting the information received from the wearable radio communication device through the first communication link, to the headset through the second communication link, and the control unit transmits to the headset an instruction signal for controlling the headset, through the first and second communication links utilizing the first repeating function.

In another preferred form, the headset comprises a memory for storing the voice data and an audio reproduction unit for reading the voice data from the memory and performing the audio reproduction processing for outputting the voice data as a sound from the voice input/output unit, and the control unit transmits the instruction signal in the form of a signal for instructing the headset to perform the audio reproduction processing.

Further, the mobile telephone device may have the second repeating function for transmitting the information received from the headset through the second communication link, to the wearable radio communication device through the first communication link, in which case the control unit receives the information from the headset through the second and first links utilizing the second repeating function.

In this preferred form, the headset preferably comprises a memory for storing the voice data, an audio reproduction unit for reading the voice data from the memory and performing the audio reproduction processing for outputting the voice data as a sound from the voice input/output unit, and a device for outputting a list of the information stored in the memory. Also, the wearable radio communication device further comprise an operating unit and the control unit receives from the headset the list of the information stored in the memory and displays it on the display unit, and transmits to the headset an instruction to perform the audio reproduction processing for the voice data as instructed by the operation of the operating unit.

The wearable radio communication device of various forms described above is preferably a radio communication device of wrist watch type wearable on the wrist of the user.

In still another preferred form, the wearable radio communication device has the function as a wrist watch, and displays the present time when the image or the information obtained by data communication is not displayed on the display unit.

The present invention further provides a headset comprising a memory for storing music information, an audio reproduction unit for reproducing the music information stored in the memory and outputting the music information as a sound, a local radio communication unit for effecting the local bi-directional radio communication with a mobile telephone device capable of effecting the local bi-directional radio communication with a wearable radio communication device, and a control unit for causing the local radio communication unit to receive the music information from the mobile telephone device and instructing the audio reproduction unit to reproduce the music information stored in the memory, in accordance with the instruction signal received from the wearable radio communication device through the mobile telephone device.

The memory included in the headset may be a semiconductor memory removable from the headset.

BEST MODE FOR CARRYING OUT THE INVENTION

Preferred embodiments of the present invention will be explained with reference to the drawings.

1 First Embodiment

[1.1] Configuration of First Embodiment

Figure 1:
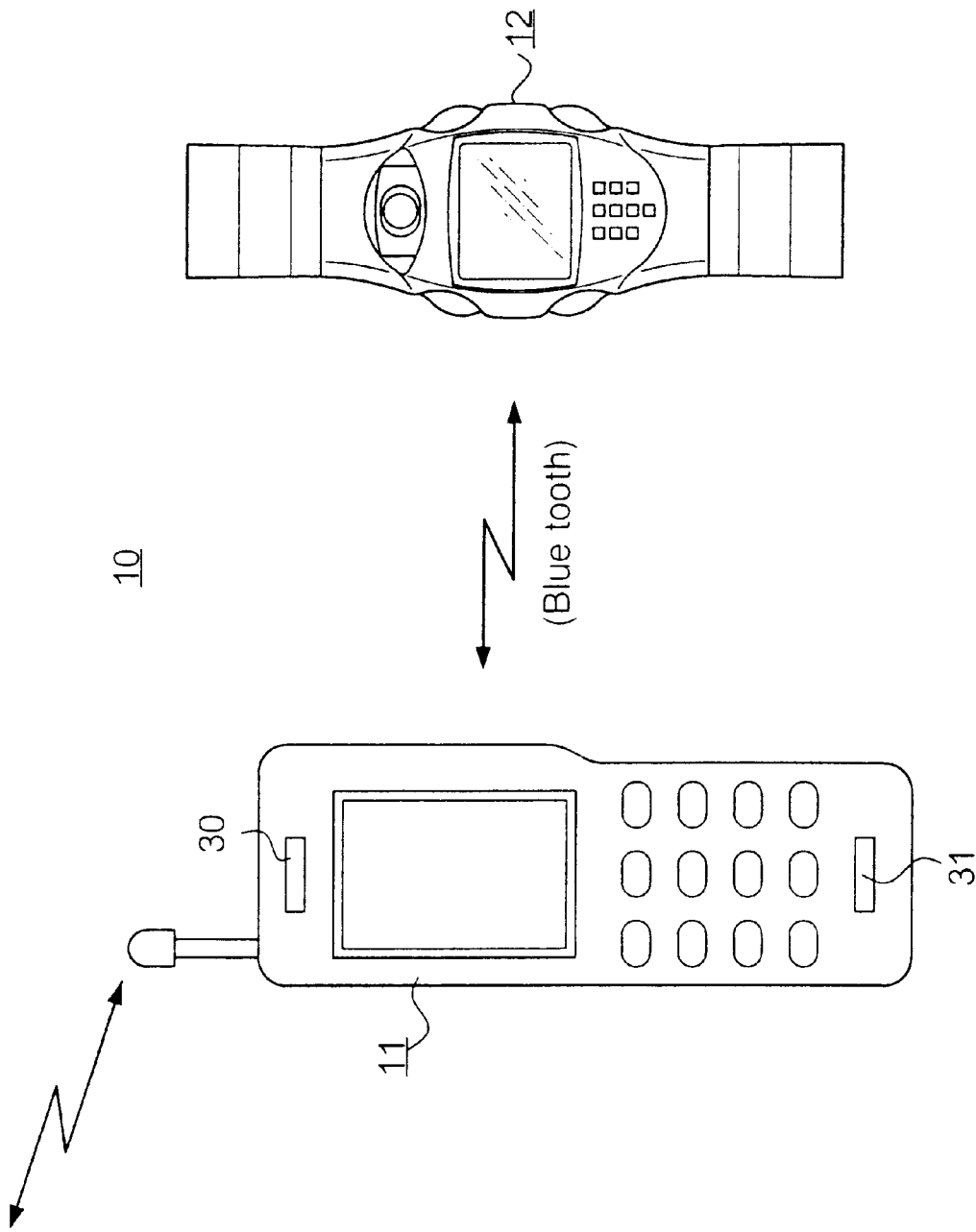
FIG. 1 is a diagram showing a configuration of a mobile videophone system according to a first embodiment of the invention.

FIG. 1 is a diagram showing a configuration of a mobile videophone system 10 according to a first embodiment of the invention. As shown in FIG. 1, the mobile videophone system 10 comprises a mobile telephone device 11 and a wrist watch-type information apparatus 12 as main component elements. The mobile telephone device 11 is capable of processing an image sequence such a MPEG4 (Moving Picture Experts Group phase 4), and voice communication and data communication with the other party through a mobile communication network and/or a fixed communication network. The wrist watch-type information apparatus 12 has the functions of local bi-directional radio communication (short distance radio communication) with the mobile telephone device by bluetooth or the like in addition to the functions similar to an ordinary wrist watch. The wrist watch-type information apparatus 12, by this function of bi-directional communication, can receive the image sequence data and text information from the mobile telephone device 11 and display it, while at the same time picking up an image and transmitting image data to the mobile telephone device 11.

Figure 2:
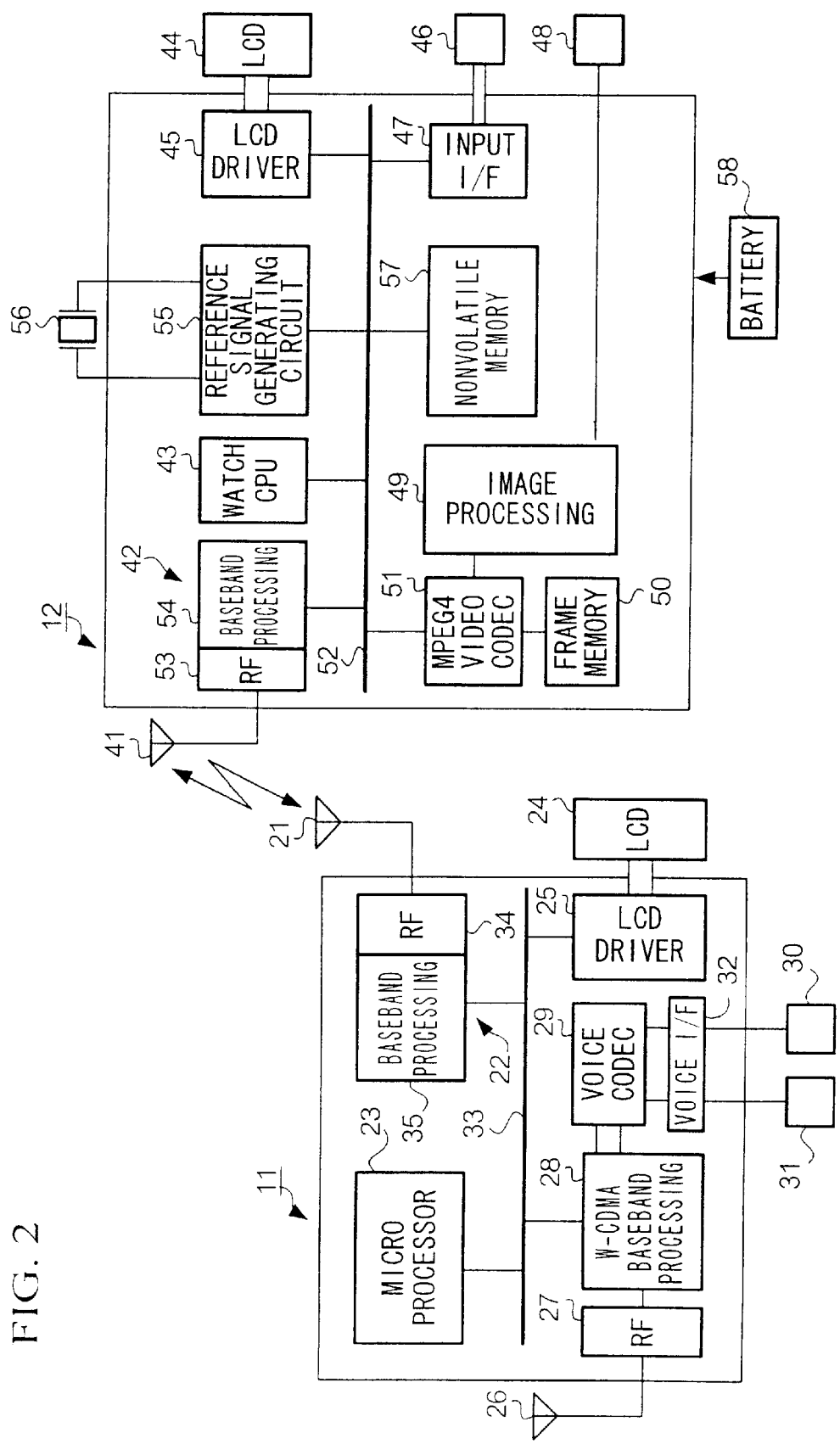
FIG. 2 is a block diagram showing a configuration of a mobile telephone device and a wrist watch-type information apparatus according to the same embodiment.
Figure 3:
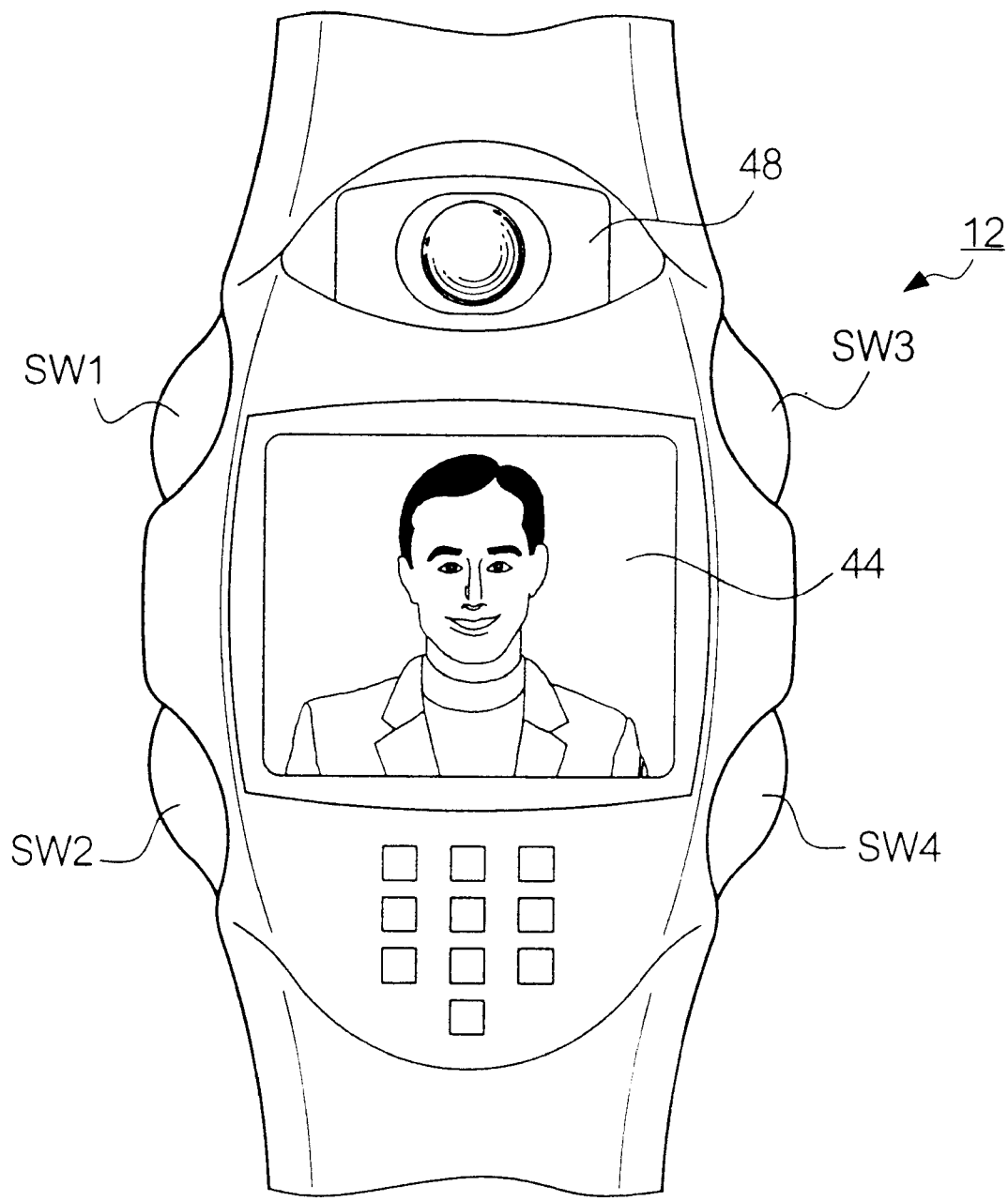
FIG. 3 is a diagram showing an example of display of the wrist watch-type information apparatus according to the same embodiment.

FIG. 2 is a block diagram showing a configuration of the mobile telephone device 11 and the wrist watch-type information apparatus 12. FIG. 3 shows an outer appearance of the wrist watch-type information apparatus 12. First, with reference to FIG. 2, the configuration of the mobile telephone device 11 will be explained. A bluetooth module 22 includes an RF unit 34 for carrying out operations corresponding to the RF (radio frequency) layer in the bluetooth communication and a baseband processing unit 35 for carrying out operations corresponding to the baseband layer overriding the RF layer. A microprocessor 23 includes memories (not shown) such a ROM and a RAM for storing various data. The microprocessor 23 uses these memories to control the communication and applications, and control the whole of the mobile telephone device 11 on the other hand. A LCD driver 25 is for driving a LCD (liquid crystal display) 24 under the control of the microprocessor 23. The RF unit 27 performs bi-directional radio communication with the mobile communication network by generating a signal modulated by the baseband signal to be transmitted, and transmiting the modulated signal from a mobile telephone antenna 26, and by demodulating the received signal of the mobile telephone antenna 26 to generate the baseband signal. A W-CDMA baseband processing unit 28 is a device for carrying out the baseband processing according to the W-CDMA (wide-band code division multiple access) method. The W-CDMA baseband processing unit 28 is connected with a voice CODEC 29, which in turn is connected with a speaker 30 and a microphone 31 through a voice interface unit 32. The voice CODEC 29 decodes the output signal of the W-CDMA baseband processing unit 28 and outputs voice data. The voice interface unit 32 carries out digital/analog conversion on the voice data to generate an analog voice signal which is output as a sound from the speaker 30. The voice interface unit 32 also generates voice data by analog/digital conversion of the analog signal input through the microphone 31. The voice CODEC 29 encodes the voice data and outputs the encoded voice data to the W-CDMA baseband processing unit 28. The bluetooth module 22, the microprocessor 23, the W-CDMA baseband processing unit 28 and the LCD driver 25 are interconnected through a bus 33.

Now, a configuration of the wrist watch-type information apparatus 12 will be explained with reference to FIGS. 2 and 3. A reference signal generating circuit 55 is a device which generates an oscillation signal by an external crystal oscillator 56 and generates a signal for controlling the timing of operation of various internal parts of the wrist watch-type information apparatus 12 based on the oscillation signal. A nonvolatile memory 57 is for storing information such as ID for communication. The bluetooth module 42 includes a RF unit 53 for carrying out operations corresponding to the RF layer of the bluetooth communication and a baseband processing unit 54 for carrying out operations corresponding to the baseband layer. A watch CPU 43 controls the timepiece operation while at the same time controlling the whole operation of the wrist watch-type information apparatus 12. The LCD driver 45 is a device for driving the LCD 44 under the control of the watch CPU 43. As long as the wrist watch-type information apparatus 12 is not making speech nor the data is not on display on the LCD 44, the LCD 44 displays the current time under the control of the watch CPU 43. The operating switch unit 46 includes operating switches SW1 to SW4 (FIG. 3) for allowing the user to perform various operations. The input interface unit 47 is a device for transmitting the operation event generated in the operating switch unit 46 to the watch CPU 43. A CMOS image sensor 48 is a device functioning as a camera for picking up an image and outputting an image signal. An image processing unit 49 is a device for analog/digital conversion and image synchronous processing of the image signal output from the CMOS image sensor 48 and outputting original image data. A MPEG4 video CODEC 51 includes a frame memory 50 for storing the image data. The MPEG4 video CODEC 51 generates a coded image data from the original image data in accordance with the coding method based on MPEG4 using the frame memory 50. The MPEG4 video CODEC 51 receives the coded image data from the mobile telephone device 11 through the bluetooth module 42. The MPEG4 video CODEC 51 decodes the coded image data to generate the display image data in accordance with the decoding method based on MPEG4 using the frame memory 50. The reference signal generating circuit 55, the nonvolatile memory 57, the bluetooth module 42, the watch CPU 43, the LCD driver 45, the input interface unit 47 and the MPEG4 video CODEC 51 are interconnected through a bus 52. The reference signal generating circuit 55, the nonvolatile memory 57, the bluetooth module 42, the watch CPU 43, the LCD driver 45, the input interface unit 47, the MPEG4 video CODEC 51 and the frame memory 50 are supplied with power from a battery 58. Even if power from the battery 58 stops, the information stored in the nonvolatile memory 57 is not lost.

[1,2] Operation of First Embodiment

With the arrival of an incoming call from a telephone set of a given calling party to the mobile telephone device 11, the RF unit 27 of the mobile telephone device 11 demodulates the received signal of the antenna 26 to generate the baseband signal. The W-CDMA baseband processing unit 28 extracts the coded image data and the coded audio data independently of each other from the baseband signal.

The bluetooth module 22 processes the coded image data for the baseband layer and the RF layer under the control of the microprocessor 23, and generates a signal modulated by the coded image data. This signal is transmitted to the wrist watch-type information apparatus 12 through a bluetooth antenna 21. In parallel with this, the voice CODEC 29 decodes the coded voice data to generate the voice data. The voice interface unit 32 outputs the voice data as an analog voice signal from the speaker 30. As a result, the voice of the calling party is produced from the speaker 30.

Figure 4:
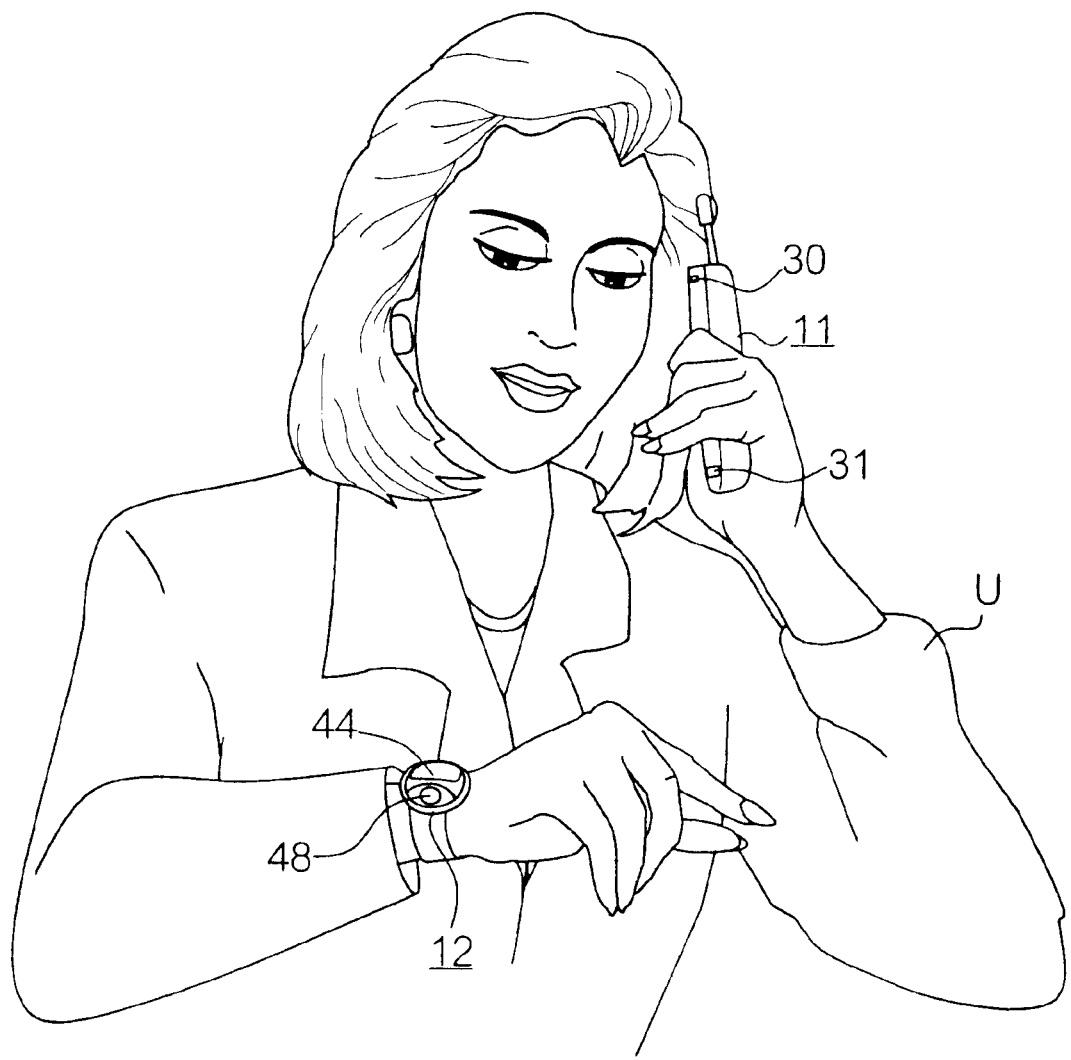
FIG. 4 is a diagram showing the manner in which the mobile telephone device and the wrist watch-type information apparatus are used according to the same embodiment.

The wrist watch-type information apparatus 12 receives the signal from the mobile telephone device 11 through the bluetooth antenna 41. The bluetooth module 42 processes the received signal for the RF layer and the baseband layer, and demodulates the received signal to generate the coded image data as a baseband signal. The MPEG4 video CODEC 51 decodes the coded image data to generate the image data using the frame memory 50 under the control of the watch CPU 43, and outputs the image data to the LCD driver 45. The LCD driver 45 displays the image corresponding to the image data on the display screen of the LCD 44. FIG. 3 illustrates an image of the calling party thus displayed on the display screen of the LCD 44. The user U of the mobile videophone system 10 can effect communication with the calling party in a relaxed position on the videophone as shown in FIG. 4 using the mobile telephone device 11 and the wrist watch-type information apparatus 12. Specifically, the user U can make speech with the calling party by holding the mobile telephone device 11 with the speaker 30 located near his ear and the microphone 31 located near his mouth. At the same time, the user U can face the LCD 44 and the CMOS image sensor 48 of the wrist watch-type information apparatus 12 at an appropriate distance, and while checking the received image of the calling party displayed on the LCD 44, can cause the CCD image sensor 48 to pick up his image. In the process, the mobile telephone device 11 and the wrist watch-type information apparatus 12 operate as follows.

First, when the user U utters a voice, the voice signal is output from the microphone 31. This voice signal is converted into a digital audio data by the voice interface unit 32. The voice CODEC 29 generates coded voice data from the voice data. The W-CDMA baseband processing unit 28 outputs the coded voice data as a baseband signal to the RF unit 27. The RF unit 27 generates a signal modulated by the baseband signal, and transmits it from the mobile telephone antenna 26. As a result, the voice of the user U is output on the calling party side.

On the other hand, the image of the user U picked up by the CMOS image sensor 48 is output as an image signal to the image processing unit 49. The image processing unit 49 processes the image signal by analog/digital conversion and image synchronization and outputs the original image data to the MPEG4 video CODEC 51. The MPEG4 video CODEC 51 generates the coded image data from the original image data under the control of the watch CPU 43, and transfers it to the bluetooth module 42. The bluetooth module 42 processes the coded image data for the baseband layer and the RF layer, and generating the signal modulated by the coded image data, transmits it from the bluetooth antenna 41. This signal is received by the bluetooth antenna 21 of the mobile telephone device 11. Then, the bluetooth module 22 processes the received signal for the baseband layer and the RF layer and thus generates the coded image data from the received signal. The W-CDMA baseband processing unit 28 outputs the coded image data as a baseband signal to the RF unit 27. The RF unit 27 generates a signal modulated by the baseband signal, and transmits it from the mobile telephone antenna 26. This signal is sent to the calling party through a mobile communication network. As a result, the image of the user U is displayed on the calling party side.

[1.3] Effects of First Embodiment

As described above, according to this embodiment, the user can make speech with the other party by the mobile telephone device in a relaxed position, while at the same time causing the received image of the other party to be displayed on the display unit of the wrist watch-type information apparatus on the one hand and picking up the image transmitted to the other party on the other hand.

[1.4] Modifications of First Embodiment

[1.4.1] First Modification

In this modification, the telephone numbers and the names of the desired other parties or such information as names or nicknames of the other parties can be stored by the user in the nonvolatile memory 57 of the wrist watch-type information apparatus 12. With the arrival of an incoming call at the mobile telephone device 11, the incoming call arrival announcing signal including the telephone number of the calling party is sent to the wrist watch-type information apparatus 12. In the wrist watch-type information apparatus 12, the telephone number included in the incoming call arrival announcing signal is displayed on the LCD 44. At the same time, the name or nickname of the other party associated with the telephone number is read from the nonvolatile memory 57 and displayed on the LCD 44. According to this modification, the user can check the calling party by the information displayed on the LCD 44 of the wrist watch-type information apparatus 12. In the case where the mobile telephone device 11 has the voice response function in this modification, the wrist watch-type information apparatus 12 may be provided with the function of transmitting an instruction signal for performing the voice response function. Specifically, with the arrival of an incoming call, the operating switches SW1 to SW4 of the operating switch unit 46 of the wrist watch-type information apparatus 12 are operated to input an incoming call response instruction. Then, the wrist watch-type information apparatus 12 transfers the instruction to the mobile telephone device 11. The mobile telephone device 11, in response to this incoming call response instruction, perform the processing for response to the incoming call. As an example of the processing for the incoming call response, a wait request voice message is transmitted for requesting the calling party to keep off hook or a recall request voice message is transmitted for requesting the other party to call again later or a message storage processing is performed for recording the message as a function of an automatic answering machine.

[1.4.2] Second Modification

In this modification, with the arrival of an electronic mail at the mobile telephone device 11, the title, etc. of the electronic mail is sent to the wrist watch-type information apparatus 12. The wrist watch-type information apparatus 12 displays this title. Under this condition, assume that the operating switches SW1 to SW4 of the operating switch unit 46 are operated in a predetermined way. Then, the wrist watch-type information apparatus 12 requests the mobile telephone device 11 to download the electronic mail and transfer it to the wrist watch-type information apparatus 12. The wrist watch-type information apparatus 12 receives the electronic mail from the mobile telephone device 11 and displays the contents thereof on the LCD 44.

[1.4.3] Third Modification

In this modification, the wrist watch-type information apparatus 12 includes, like the mobile telephone device 11, a microphone, a speaker, a voice input/output interface unit, a voice CODEC and the like devices for voice communication. The mobile telephone device 11 connects the line with the calling party and sends the voice from the calling party to the wrist watch-type information apparatus 12, while the voice which may be sent from the wrist watch-type information apparatus 12 is sent to the calling party. According to this modification, even in the case where the mobile telephone device 11 is placed in a bag or the like, the user can make speech using the wrist watch-type information apparatus 12. In this case, the voice data communication function of the wrist watch-type information apparatus 12 can be set arbitrarily by the user in either an operative mode or an inoperative mode.

2 Second Embodiment

Figure 5:
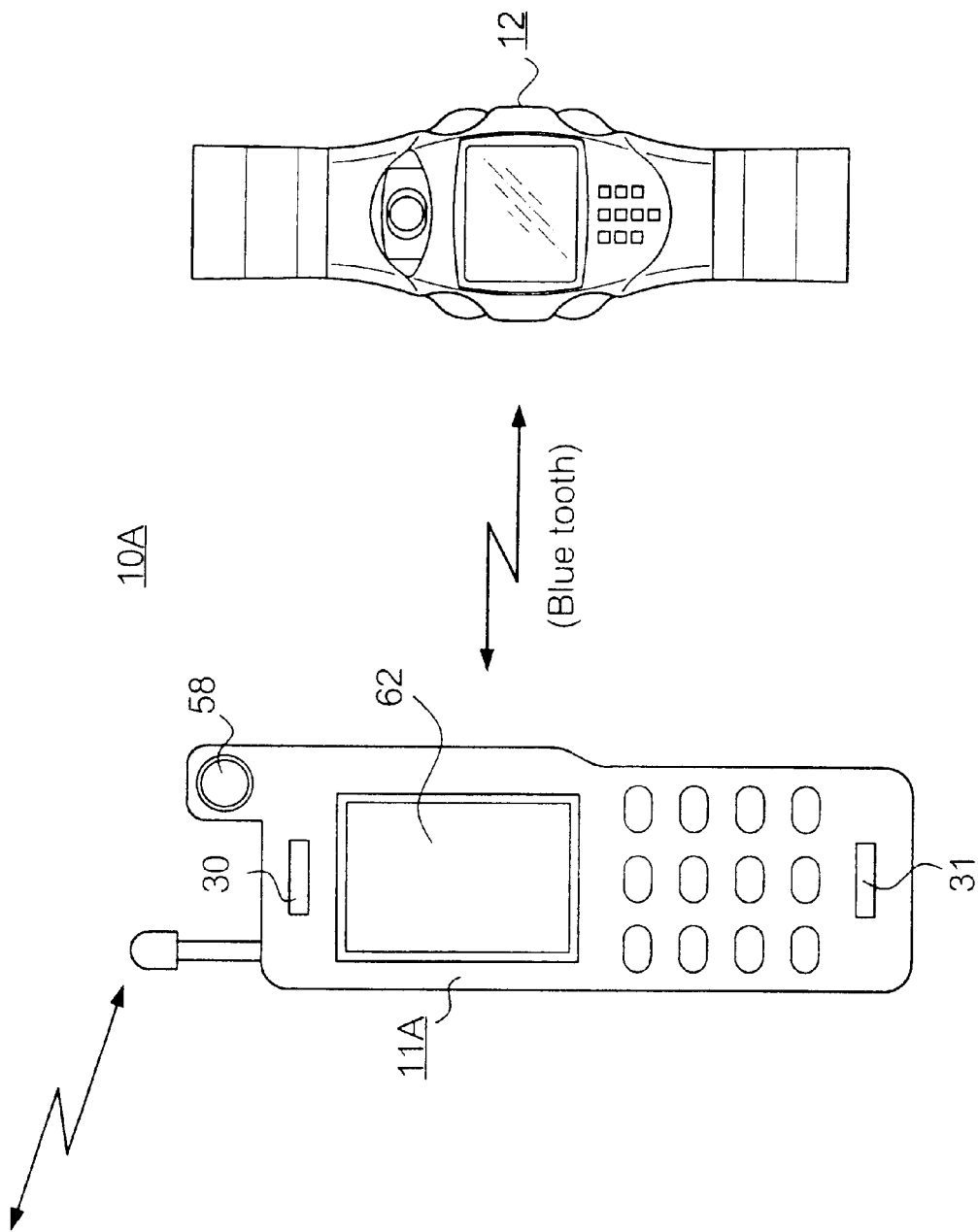
FIG. 5 is a diagram showing a configuration of a mobile videophone system according to a second embodiment of the invention.
Figure 6:
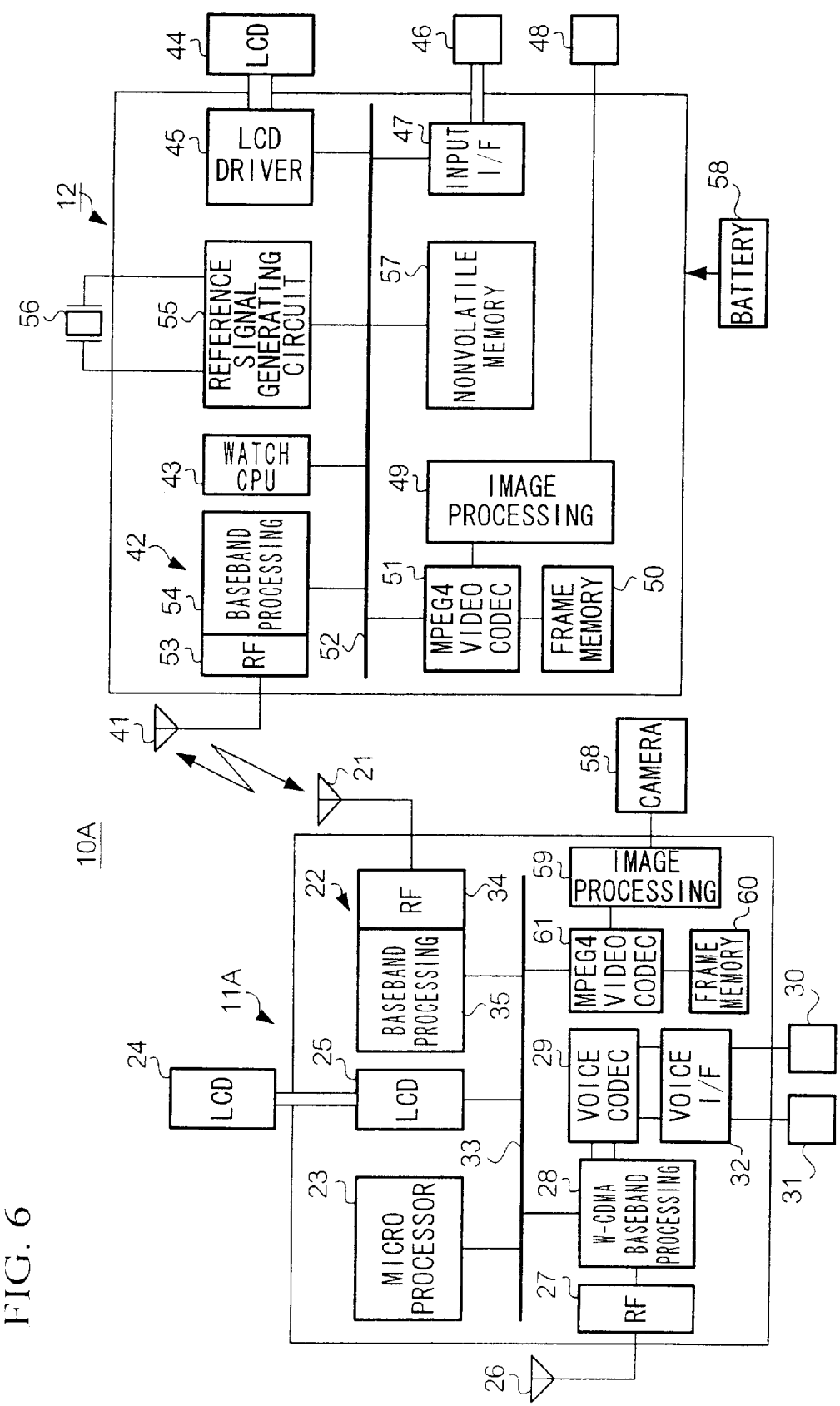
FIG. 6 is a block diagram showing a configuration of a mobile telephone device and a wrist watch-type information apparatus according to the same embodiment.

FIG. 5 is a diagram showing a configuration of a mobile videophone system 10A according to a second embodiment of the invention. FIG. 6 is a block diagram showing a configuration of the mobile telephone device 11A and the wrist watch-type information apparatus 12 making up the main component elements of the system 10A.

The mobile telephone device 11A, as compared with the mobile telephone device 11 of the first embodiment, additionally includes a camera 58, an image processing unit 59, a MPEG4 video CODEC 61 and a frame memory 60. The camera 58 picks up an image and outputs an image signal. The image processing unit 59 processes the image signal output from the camera 58 by analog/digital conversion and the image synchronization and outputs the original image data. The MPEG4 video CODEC 61 generates the coded image data from the original image data output from the image processing unit 59, by the MPEG4 coding method using the frame memory 60. The MPEG4 video CODEC 61 can receive the coded image data from the other party through the mobile telephone antenna 26, the RF unit 27 and the W-CDMA baseband processing unit 28, or can receive the coded image data from the wrist watch-type information apparatus 12 through the bluetooth module 22. The MPEG4 video CODEC 61 decodes each coded image data to generate the image data by the MPEG4 decoding method using the frame memory 60. The other component elements are similar to those of the mobile telephone device 11 and will not be described. Also, the wrist watch-type information apparatus 12 according to this embodiment is similar to that of the first embodiment and will not be described.

According to this embodiment, like the first embodiment, the image including the image sequence can be displayed on the wrist watch-type information apparatus 12, and the voice and image sequence can be transmitted and received to and from the other party with the mobile telephone device 11A alone. The operation of transmitting and receiving the image sequence will be explained below. The operation for transmitting/receiving the voice is identical to that for an ordinary mobile telephone device and therefore will not be described.

First, with the arrival of an incoming all at the mobile telephone device 11A, the RF unit 27 demodulates the baseband signal from the signal received through the antenna 26, and the W-CDMA baseband processing unit 28 extracts the coded image data and the coded voice data independently of each other from the baseband signal. The coded image data is the image of the face of the calling party and the coded voice data is the voice of the calling party, for example. The coded voice data is output from the speaker 30 as a voice through the voice CODEC 29 and the voice interface 32.

The MPEG4 video CODEC 6 decodes the coded image data to generate the image data under the control of the microprocessor 23 and outputs the image data to the LCD driver 25. The LCD driver 25 drives the LCD 24 by the image data. As a result, the image of the face of the calling party, for example, is displayed on the LCD 24.

An image is also picked up by the camera 58, and the image signal is output from the camera 58 to the image processing unit 59. The image processing unit 59 generates the original image data by processing the image signal by analog/digital conversion and the image synchronization. The MPEG4 video CODEC 61 generates the coded image data from the original image data according to the MPEG4 coding method under the control of the microprocessor 23. The W-CDMA baseband processing unit 28 uses the coded image data as a baseband signal, and the RF unit 27 generates a signal modulated by the baseband signal and transmits it from the mobile telephone antenna 26. This signal is transmitted to the calling party through a mobile communication network. As a result, the calling party can display the image of the user U (FIG. 4) of the mobile telephone device 11A.

As described above, this embodiment, in addition to the effects of the first embodiment, permits the image data including the image sequence to be transmitted or received only with the mobile telephone device and can thus produce the effect of an improved operating convenience.

In the embodiment described above, the image is transmitted to or received from the other party only by the mobile telephone device 11A or the wrist watch-type information apparatus 12. As an alternative, the mobile telephone device 11A may produce an image displayable on a single screen (such as an image P3) by synthesizing the image (such as an image P1) picked up by the mobile telephone device 11A and the image (such as an image P2) picked up by the wrist watch-type information apparatus 12, and may send the synthesized image to the other party. In this case, the images of a plurality of persons can be sent. A specific method of synthesis will be explained. First, the images P1 and P2 are temporarily stored in the frame memory 60. Then, the number of horizontal scanning lines of the images P1 and P2 is reduced to about one half or two thirds. After reducing the number of scanning lines this way, the two images are synthesized to produce a new image. According to this method, the image data of an image P3 is produced in which, for example, a part of the image P1 is included in the upper half portion of the screen and a part of the image P2 is included in the lower half of the screen.

3 Third Embodiment

[3.1] Configuration of Embodiment

Figure 7:
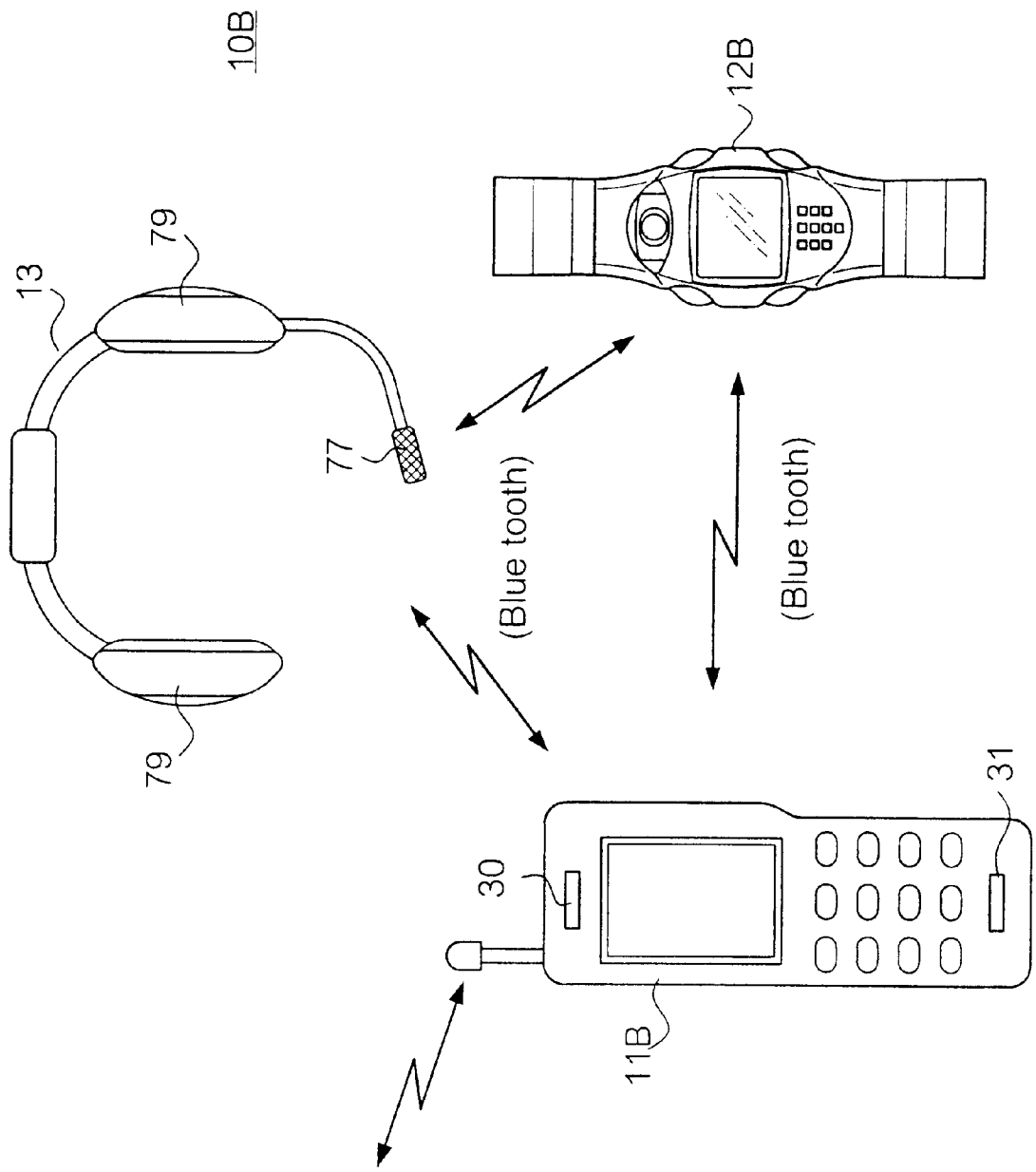
FIG. 7 is a diagram showing a configuration of a mobile videophone system according to a third embodiment of the invention.
Figure 8:
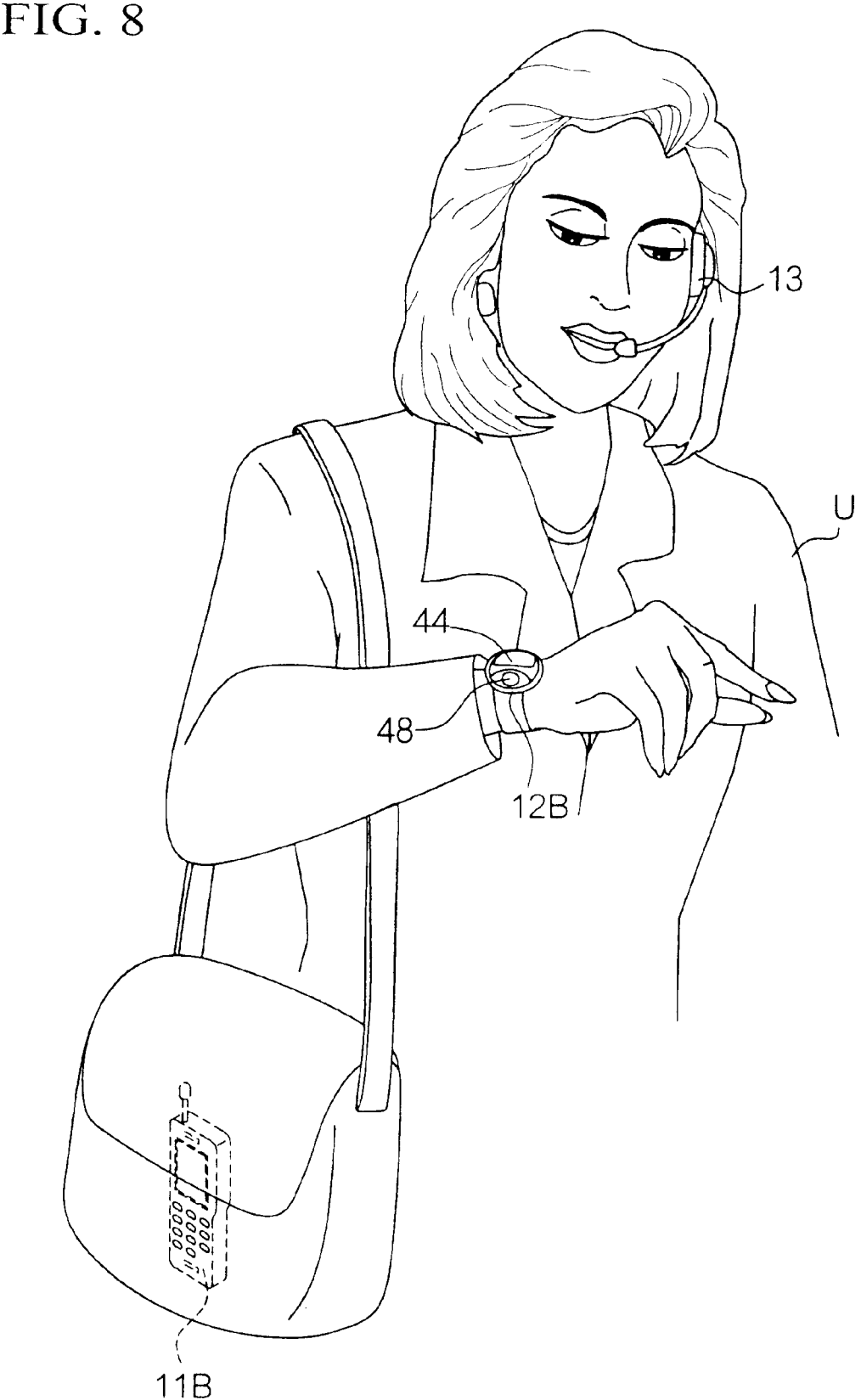
FIG. 8 is a diagram showing the manner in which the mobile telephone device, the wrist watch-type information apparatus and the headset are used according to the same embodiment.

FIG. 7 is a diagram showing a configuration of a mobile videophone system 10B according to a third embodiment of the invention. As shown in FIG. 7, the mobile videophone system 10B comprises a mobile telephone device 11B, a wrist watch-type information apparatus 12B and a headset 13 as main component parts. FIG. 8 is a diagram showing the manner in which the mobile telephone device 11B, the wrist watch-type information apparatus 12B and the headset 13 are used. In the example shown in FIG. 8, the user U places the mobile telephone device 11B in his bag, and wears the wrist watch-type information apparatus 12B on his wrist and the headset 13 on his head.

The mobile telephone device 11B can process the image sequence by such as MPEG4, and can establish communication with a telephone set connected to a fixed telephone network or another mobile telephone set accommodated in a mobile communication network. The wrist watch-type information apparatus 12B has the function of an ordinary wrist watch and at the same time the function of effecting the local bi-directional radio communication (short-distance radio communication) with the mobile telephone device 11B and the headset 13. The wrist watch-type information apparatus 12B receives the information representing the image sequence and text from the mobile telephone device 11 by bi-directional communication and displays them, while at the same time picking up an image and transmitting the image data to the mobile telephone device 11. The wrist watch-type information apparatus 12B also has the function of transmitting an instruction to the headset 13 to send music data. The headset 13 establishes the local bi-directional radio communication (short-distance radio communication) with the mobile telephone device 11B and the wrist watch-type information apparatus 12B. By this bi-directional radio communication, the headset 13 can receive the music data from the mobile telephone device 11B and reproduce stereo music.

Figure 9:
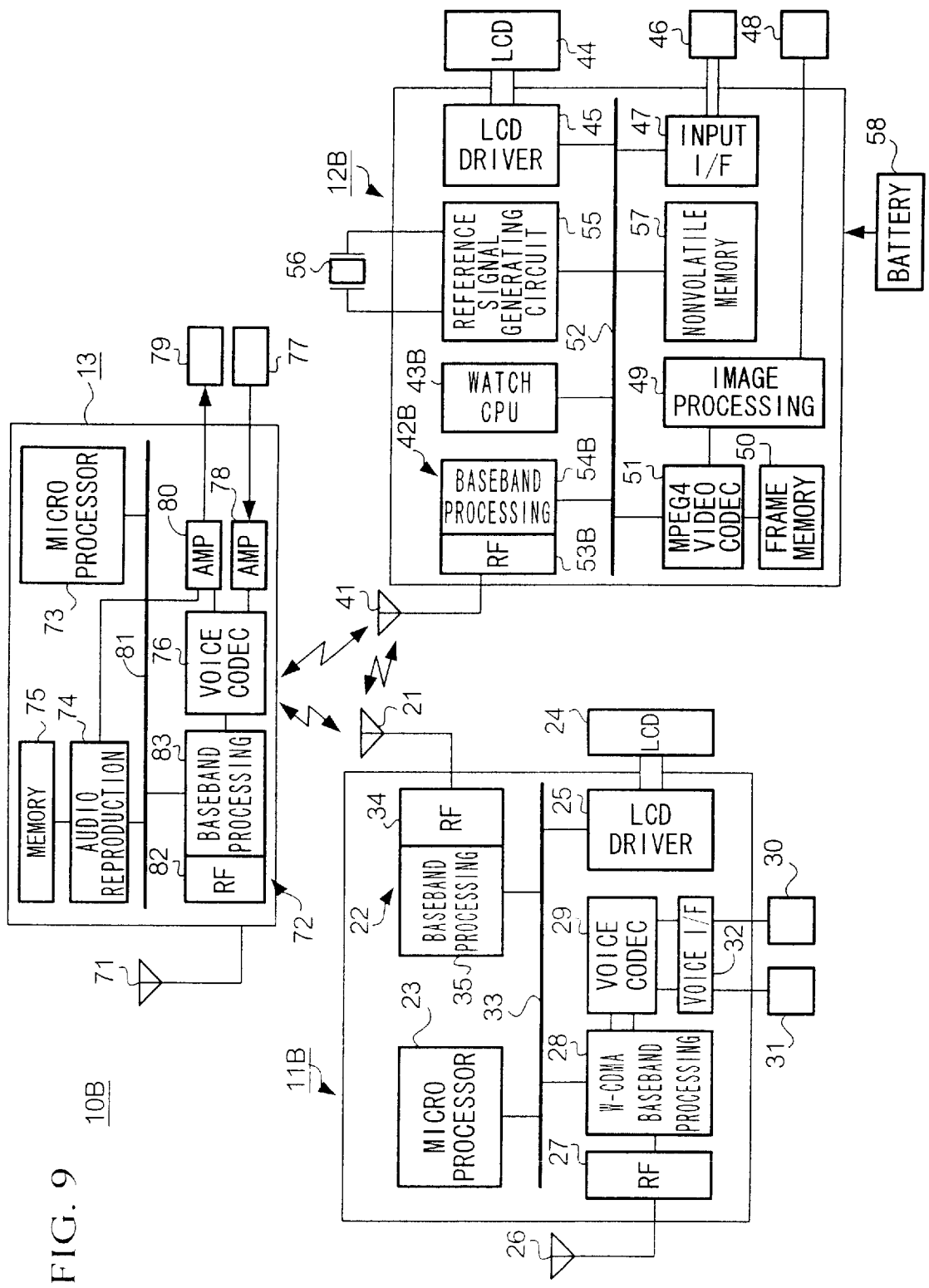
FIG. 9 is a block diagram showing a configuration of the mobile telephone device, the wrist watch-type information apparatus and the headset according to the same embodiment.

FIG. 9 is a block diagram showing a configuration of the mobile telephone device 11, the wrist watch-type information apparatus 12 and the headset 13. With reference to FIG. 9, the headset 13 will be explained. In FIG. 9, a bluetooth module 72 is a device for establishing the bluetooth communication, which is a kind of local bi-directional radio communication, with the mobile telephone device 11B through a bluetooth antenna 71. The bluetooth module 72 includes a RF unit 82 for processing the RF layer and a baseband processing unit 83 for processing the baseband layer in the bluetooth communication. The microprocessor 73 includes a memory 75 such as a ROM or a RAM for storing various data. The microprocessor 73 controls the communication and applications using this memory while at the same time controlling the whole operation of the headset 13. The memory 75 is provided for storing the audio data of MP3 (MPEG Audio layer3) type. An example of data stored in the memory 75 includes the music contents acquired by the mobile telephone device 11B or what is called the audio data of incoming melodies. The memory 75 is preferably a nonvolatile semiconductor memory replaceably mounted on the headset 13. The audio reproduction unit 74 reproduces the stereo music of the audio data of MP3 type under the control of the microprocessor 73. The bluetooth module 72 is connected with a voice CODEC 74. The voice CODEC 74 is connected to a headphone 79 through an amplifier 80 on the one hand and to a microphone 77 through an amplifier 78 on the other. The voice CODEC 74 decodes the coded voice data input through the bluetooth module 72 to generate an analog voice signal and outputs it. The amplifier 80 can amplify the analog music signal and can output it as a voice from the headphone 79. The amplifier 78 amplifies the voice signal input through the microphone 77, and outputs it to the voice CODEC 76. The voice CODEC 76 generates the coded voice data from the voice signal, and outputs it to the bluetooth module 72. The bluetooth module 72, the microprocessor 73 and the audio reproduction unit 74 are connected to each other through a bus 81.

Now, the mobile telephone device 11B will be explained. In the mobile telephone device 11B according to this embodiment, a microprocessor 23B is used instead of the microprocessor 23 (FIG. 2) of the first embodiment. The microprocessor 23 according to the first embodiment establishes a communication link with the wrist watch-type information apparatus 10 by the bluetooth module 35, and exchanges information with the wrist watch-type information apparatus 10 through this communication link. With the microprocessor 23B according to this embodiment, on the other hand, the communication link is established with each of the the wrist watch-type information apparatus 12B and the headset 13 through the bluetooth module 35, and using these communication links, the microprocessor 23B transmits and receives information to and from the wrist watch-type information apparatus 12B and the headset 13. The other points are similar to the corresponding ones of the mobile telephone device 11 of the first embodiment.

Now, the wrist watch-type information apparatus 12B will be explained. The wrist watch-type information apparatus 12B according to this embodiment comprises a bluetooth module 42B and a watch CPU 43B in place of the bluetooth module 42 and the watch CPU 43 (FIG. 2), respectively, of the first embodiment.

The bluetooth module 42B is a device for effecting the bluetooth communication, which is a kind of local bi-directional radio communication, with the mobile telephone device 11B. The bluetooth communication effected in this embodiment is what is called the half-duplex bi-directional radio communication. The bluetooth module 42B is configured of a RF unit 53B for processing the RF layer and a baseband processing unit 54B for processing the baseband layer in the bluetooth communication. More specifically, the baseband processing unit 54B is a device for transmitting and receiving the baseband signal to and from the called parties of the wrist watch-type information apparatus 12B under the control of the watch CPU 43B. The RF unit 53B performs the spectrum spreading modulation of the frequency hopping (FH) type using the baseband signal addressed to the mobile telephone device 11B, and outputs the resulting transmission signal from the antenna 41. Also, the RF unit 53B carries out the spectrum spreading modulation of FH type for the received signal of the antenna 41 and demodulates the baseband signal addressed to the wrist watch-type information apparatus 12B.

Figure 10:
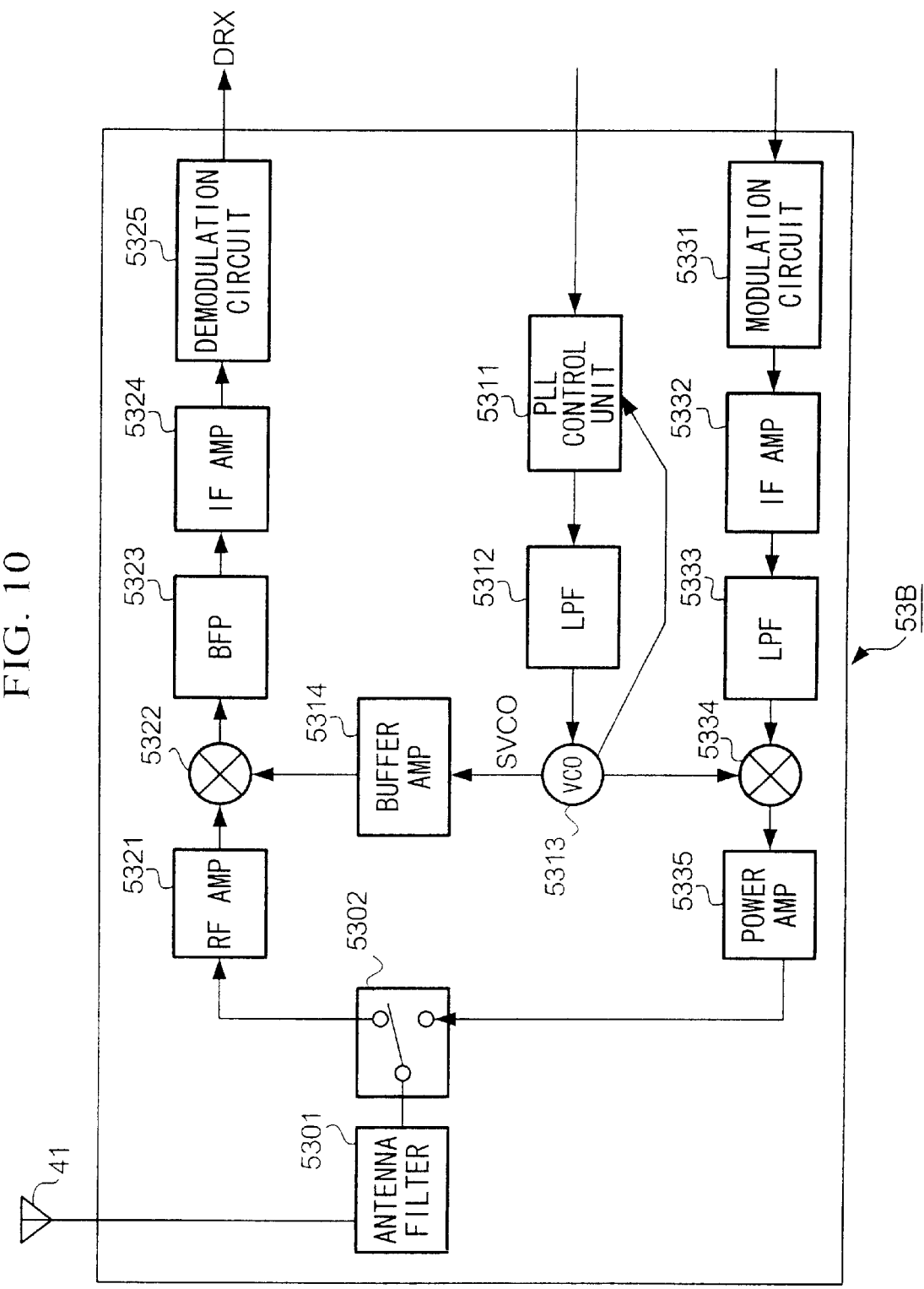
FIG. 10 is a block diagram showing a configuration of the RF unit of the wrist watch-type information apparatus according to the same embodiment.

The configuration of the RF unit 53B will be explained with reference to FIG. 10. As shown in FIG. 10, the antenna 41 is connected through an antenna filter 5301 to a switch circuit 5302 for switching transmission and receiving for half-duplex bi-directional communication. When the wrist watch-type information apparatus 12B transmits a signal, the switch circuit 5302 connects the antenna filter 5301 to the output terminal of the power amplifier 5335, and when receiving a signal, connects the antenna filter 5301 to the input terminal of the RF amplifier 5321.

A PLL control unit 5311, a low-pass filter 5312 and a voltage controlled oscillator (VCO) 5313 make up a PLL (phase locked loop) for generating an oscillation signal SVCO. The PLL control circuit 5311 is supplied with a synthesizer control signal SSY from the baseband processing unit 54B. The frequency of the oscillation signal SVCO is determined by the synthesizer control signal SSY. In order to change the frequency of the oscillation signal SVCO with time in accordance with a predetermined PH pattern, the baseband processing unit 54B changes the synthesizer control signal SSY as required. A buffer amplifier 5314 amplifies the oscillation signal SVCO and supplies it to a mixer 5322.

The RF amplifier 5321, the mixer 5322, the band-pass filter 5323, the IF amplifier 5324 and the demodulation circuit 5325 receive the received signal of the antenna 41 through the antenna filter 5301 and the switch circuit 5302, and make up a receiving circuit for demodulating the received data DRX from the received signal. More specifically, in receive mode, the antenna filter 5302 removes the unnecessary components from the received signal of the antenna 41 and outputs only the required components through the switch circuit 5302 to the RF amplifier 5321. The RF amplifier 5321 amplifies the received signal and sends it to the mixer 5322. The mixer 5322 is supplied with the oscillation signal SVCO having a frequency changing with time in accordance with the FH pattern. The mixer 5322 mixes the oscillation signal SVCO with the received signal from the RF amplifier 5321 thereby to subject the received signal to the inverse spectrum spreading. The band-pass filter 5323 selects the IF (intermediate frequency) signal of the intermediate frequency band out of the output signals of the mixer 5322, and outputs the selected signal to the IF amplifier 5324. The IF amplifier 5324 amplifies the IF signal and outputs the amplified signal to the demodulation circuit 5325. The demodulation circuit 5325, in turn, demodulates the received data DRX providing a baseband signal from the IF signal, and outputs it to the baseband processing unit 54B.

The modulation circuit 5331, the IF amplifier 5322, the low-pass filter 5323, the mixer 5334 and the power amplifier 5335 make up a transmission circuit for generating a transmission signal to be supplied to the switch circuit 302. More specifically, in transmission mode, the modulation circuit 5331 modulates the carrier by the transmission data DTX supplied from the baseband processing unit 54B, and outputs an IF signal. This IF signal is supplied to the mixer 5334 through the IF amplifier 5322 and the low-pass filter 5333. This mixer 5334 is supplied with the oscillation signal SVCO having a frequency changing with time in accordance with the FH pattern. The mixer 5334 mixes the oscillation signal SVCO with the IF signal, and subjecting it to the spectrum spreading of FH type, outputs a transmission signal of a high frequency. The power amplifier 5335 amplifies the high-frequency signal, and outputs the amplified signal to the switch circuit 5302. The antenna filter 5301 receives the output signal of the power amplifier 5335 through the switch circuit 5302, and removing the unnecessary components, outputs only the required components to the antenna 41.

Figure 11:
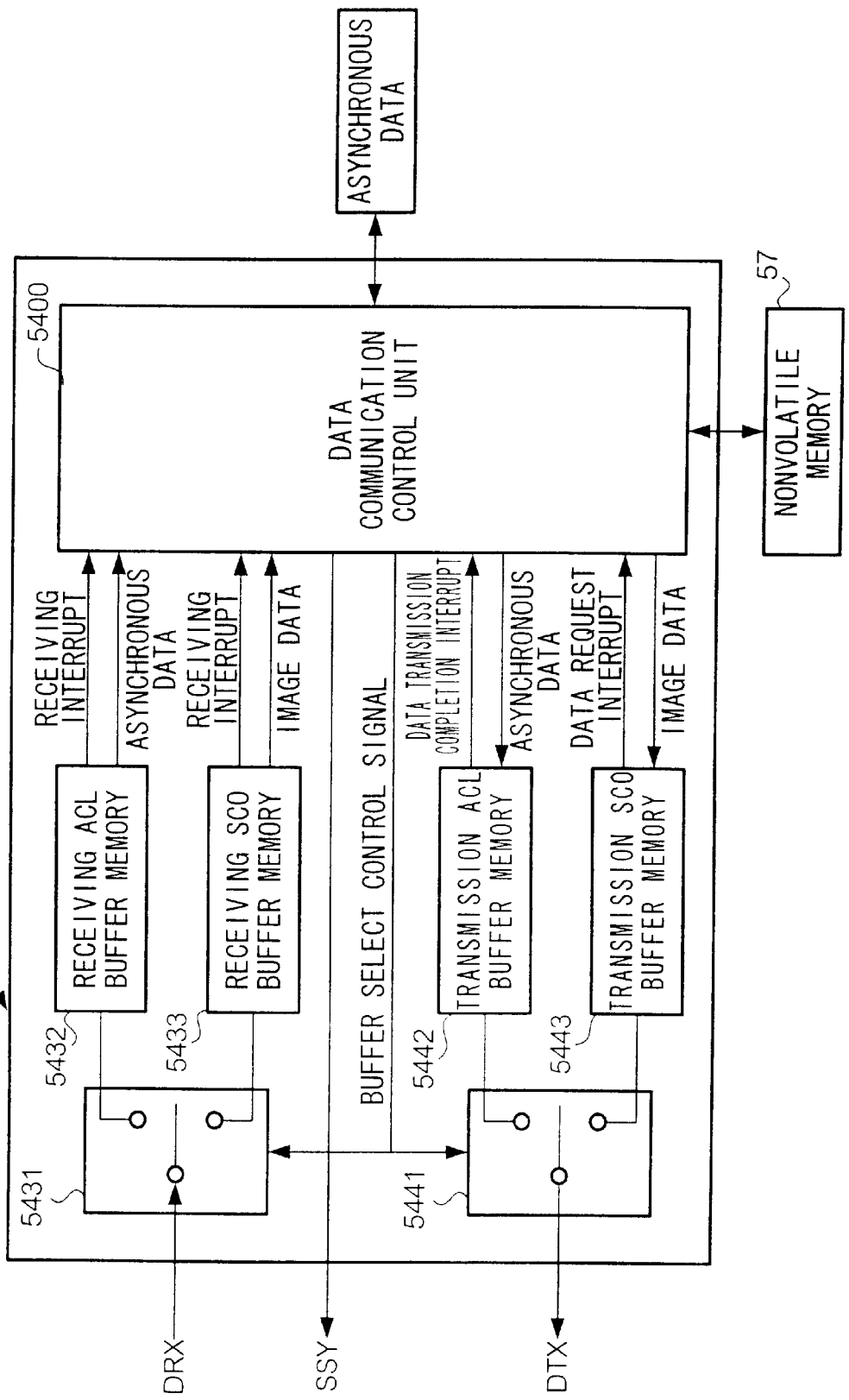
FIG. 11 is a block diagram showing a configuration of the baseband processing unit of the wrist watch-type information apparatus according to the same embodiment.

Now, the configuration of the baseband processing unit 54B will be explained with reference to FIG. 11. In FIG. 11, a data communication control unit 5400 is a device for controlling various parts in the baseband processing unit 54B. The synthesizer control signal SSY described above is generated by the data communication control unit 5400. In this embodiment, the baseband processing unit 4B, as a circuit underlying the data communication control unit 5400, includes a circuit for effecting the data communication by the ACL (Asynchronous ConnectionLess) link and a circuit for effecting the data communication by the SCO (Synchronous Connection Oriented) link.

The ACL link is an asynchronous communication link according to the bluetooth technical specification. In a pico-net comprised of one master and a plurality of slaves, the master establishes data communication with each slave by using the ACL link. In this case, the effective signaling rate of the ACL link changes with the data amount transmitted and received and the number of slaves in the pico-net. This is by reason of the fact that the master polls the slaves in accordance with the empty state of the communication slots, and effects the data communication with the slaves using an empty communication slot. As a result, normally, the ACL link is used for the communication which has a lesser need of real time processing.

The wrist watch-type information apparatus 12B according to this embodiment also transmits and receives the asynchronous data requiring no real time processing to and from the mobile telephone device 11B using the ACL link. The asynchronous data include the control data used for various instructions and control operations between, for example, the wrist watch-type information apparatus 12B and the mobile telephone device 11B.

In effecting the communication by the ACL link, the data communication control unit 5400 sends a buffer select control signal to the switch circuits 5431 and 5441 thereby to switch the switch circuit 5431 to the receiving ACL buffer memory 5432 and the switch circuit 5441 to the transmission ACL buffer memory 5442. Under this condition, the received data DRX output from the demodulation circuit 5325 is written in the receiving ACL buffer memory 5432 through the switch circuit 5431. After a packet of asynchronous data has been written, a receiving interrupt signal is sent out to the data communication control unit 5400 from a memory controller not shown. In response to this receiving interrupt signal, the data communication control unit 5400 sequentially reads the asynchronous data stored in the receiving ACL buffer memory 5432. The asynchronous data generated by the data communication control unit 5400, on the other hand, is written in the transmission ACL buffer memory 5442. After that, the asynchronous data is read from the transmission ACL buffer memory 5442 and output to the modulation circuit 5331 as transmission data DTX through the switch circuit 5441. Once a packet of the control data has been sent out and the transmission ACL buffer memory 5442 becomes empty, a data transmission over signal is sent to the data communication control unit 5400 from a memory controller not shown. In response to the data transmission over signal, the data communication control unit 5400 sequentially writes the asynchronous data next to be transmitted, in the transmission ACL buffer memory 5442.

The configuration for effecting the communication using the ACL link according to this embodiment was described in detail above.

Now, an explanation will be given of the SCO link which is a communication link of synchronous type used for the bluetooth communication. The communication with the SCO link is effected in one-to-one relation between the master and slaves. In the communication using the SCO link, a communication slot is given at predetermined regular time intervals for communication between one slave and the master. Thus, the slave can secure a predetermined signaling rate (64 kbps in the case under consideration). The SCO link is normally used for the communication requiring the real time processing.

The wrist watch-type information apparatus 12B according to this embodiment also transmits and receives the coded image data requiring the real time processing by use of the SCO link to and from the mobile telephone device 11.

In effecting the communication by the SCO link, the data communication control unit 5400 sends a buffer select control signal to the switch circuits 5431 and 5441, thereby switching the switch circuit 5431 to the receiving SCO buffer memory 5433 and the switch circuit 5441 to the transmission SCO buffer memory 5443. Under this condition, the coded image data constituting the received data DRX output from the demodulation circuit 5325 is sequentially written in the receiving SCO buffer memory 5433 through the switch circuit 5431. Once a packet of the coded image data has been written in the receiving SCO buffer memory 5433, a receiving interrupt signal is sent out to the data communication control unit 5400 from a memory controller not shown. In accordance with the receiving interrupt signal, the data communication control unit 5400 reads the coded image data stored in the receiving SCO buffer memory 5433, and supplies it to the MPEG4 video CODEC 51. On the other hand, the transmission operation is performed in the following manner. First, the coded image data to be sent to the other party, when, output from the MPEG4 video CODEC 51, are written in the transmission SCO buffer memory 5443 by the data communication control unit 5400. After that, the coded image data is read from the transmission SCO buffer memory 5433, and through the switch circuit 5441, output to the modulation circuit 5331 as the transmission data DTX. Subsequently, when a packet of the coded image data is sent out and the transmission SCO buffer memory 5443 becomes empty, a data request interrupt signal is sent out to the data communication control unit 5400 from a memory controller not shown. In response to this data request interrupt signal, the data communication control unit 5400 acquires the coded image data to be next sent, from the MPEG4 video CODEC 51, and writes them sequentially in the transmission SCO buffer memory 5443.

The configuration for communication using the SCO link according to this embodiment was described above in detail.

In FIG. 9, the watch CPU 43B transmits and receives information to and from the mobile telephone device 11B by the bluetooth module 42B. The other points are similar to the corresponding points of the first embodiment and will not be explained.

[3.2] Operation of Embodiment

[3.2.1] Basic Operation Sequence

Figure 12A:
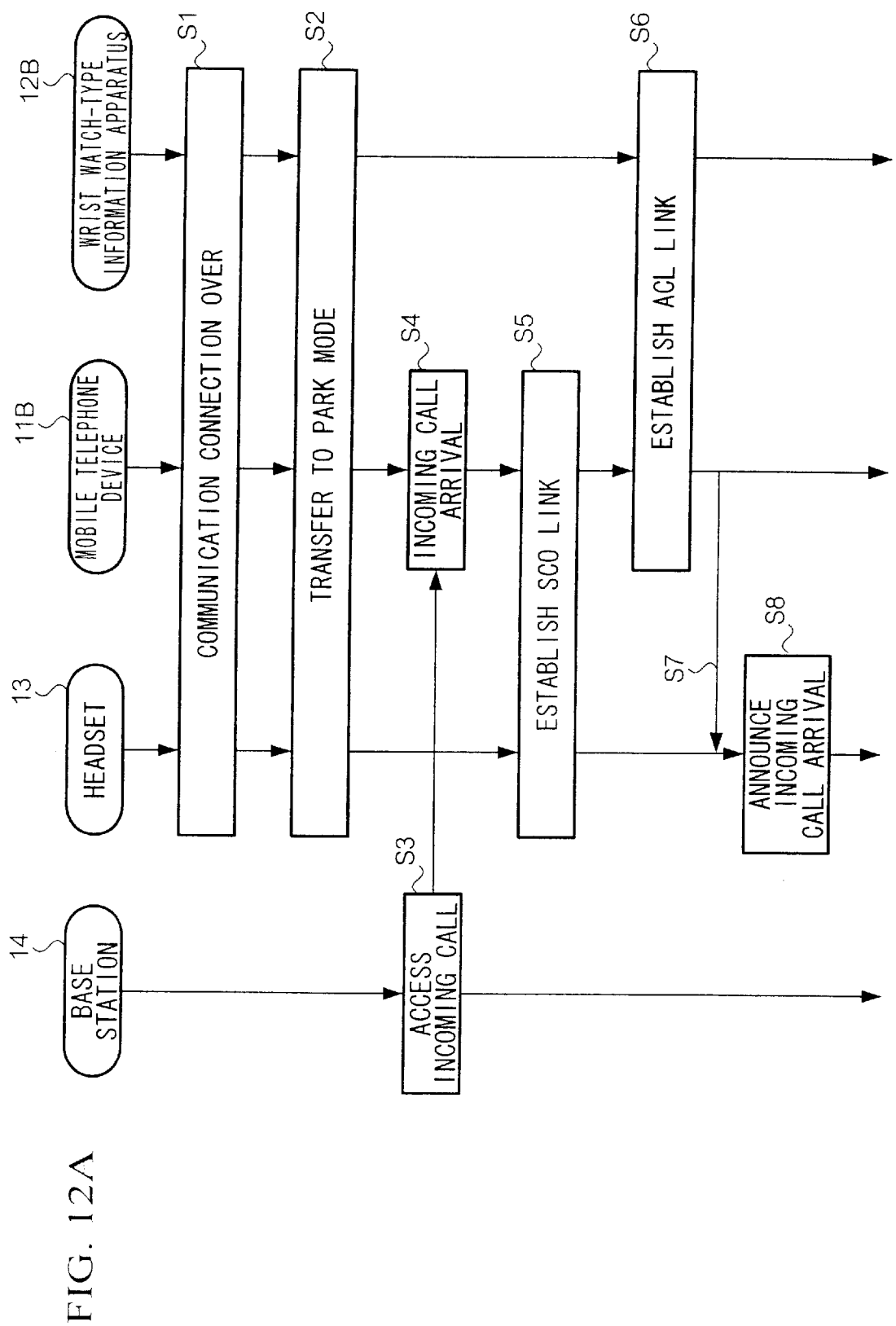
FIGS. 12A and 12B are sequence diagrams showing the operation according to the same embodiment.
Figure 12B:
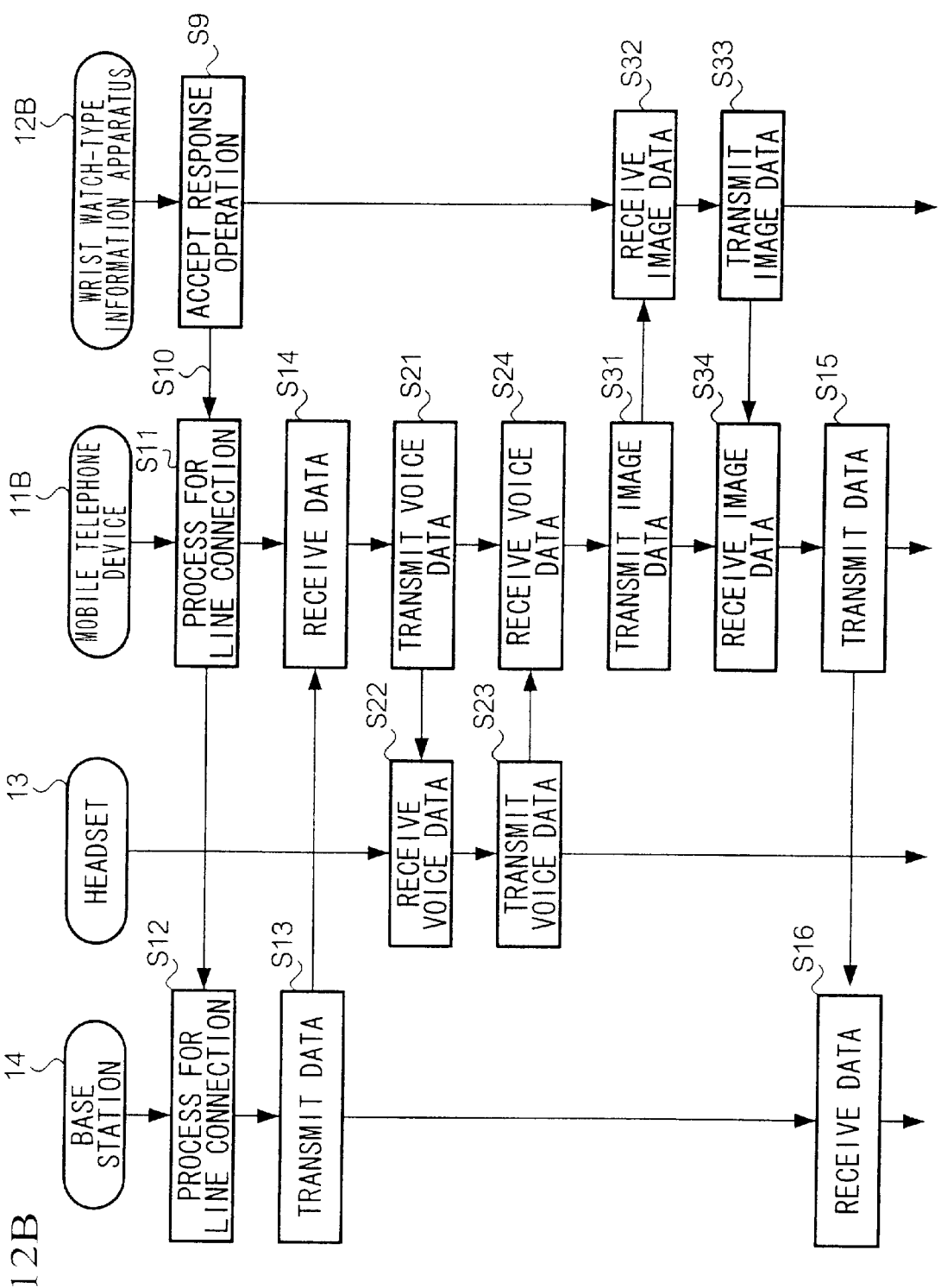

FIGS. 12A and 12B are sequence diagrams showing the operation of the mobile videophone system according to this embodiment. With reference to these sequence diagrams, the operation of this embodiment will be explained.

Figure 13:
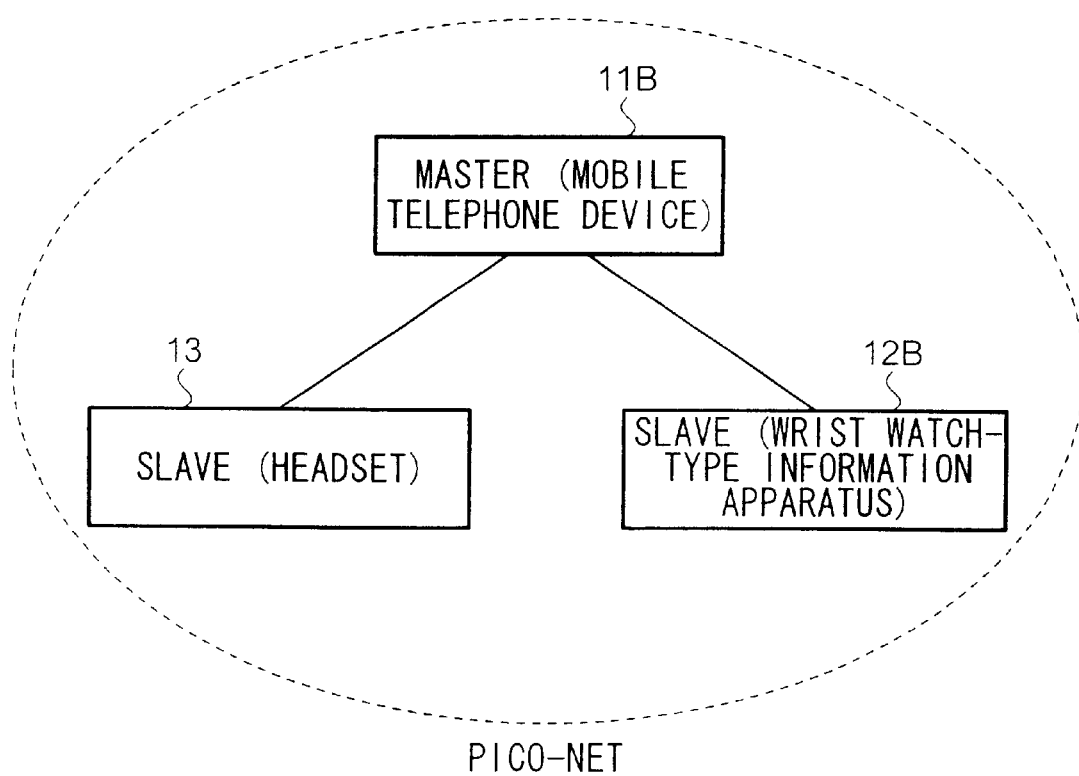
FIG. 13 is a diagram showing a pico-net configured according to the same embodiment.

The wrist watch-type information apparatus 12B executes the synchronization phase and the communication connection phase determined in the bluetooth technical specification and forms a communication network called the pico-net with the mobile telephone device 11B and the headset 13 (step S1). In the bluetooth technique, any of the bluetooth terminals making up the pico-net can be freely determined as a master. According to this embodiment, the mobile telephone device 11B is determined as a master and the wrist watch-type information apparatus 12A and the headset 13 as slaves to configure the pico-net shown in FIG. 13. Once the pico-net is formed, the operation mode of the mobile telephone device 11B, the wrist watch-type information apparatus 12B and the headset 13 transfers to a low power consumption mode called the park mode (step S2). In this mode transfer, the process is executed while identifying the other party using the bluetooth address and the link key between the master and slaves. This is a well-known technique and will not be described in detail.

In the low power consumption mode, assume that other telephone users have input the telephone number of the mobile telephone device 11B and carried out the call operation. In response, the mobile communication network transmits an incoming call signal through a base station 14 (step S3). This incoming call signal includes the telephone number of the mobile telephone device 11B. Further, the incoming call signal includes the telephone number of the telephone set of the calling party.

The mobile telephone device 11B located in the radio zone of the base station 14, on the other hand, upon receipt of the incoming call signal (step S4), instructs the headset 13, a slave, to transfer to the communication connection phase by the SCO link from the park mode. In response, the operation of the mobile telephone device 11B and the headset 13 transfers to the communication connection phase by the SCO link (step S5). Then, the mobile telephone device 11B instructs the wrist watch-type information apparatus 12B, a slave, to transfer to the communication connection phase by the ACL link from the park mode. In response, the operation of the mobile telephone device 11B and the wrist watch-type information apparatus 12B transfers to the communication connection phase by the ACL link (step S6).

Figure 14:
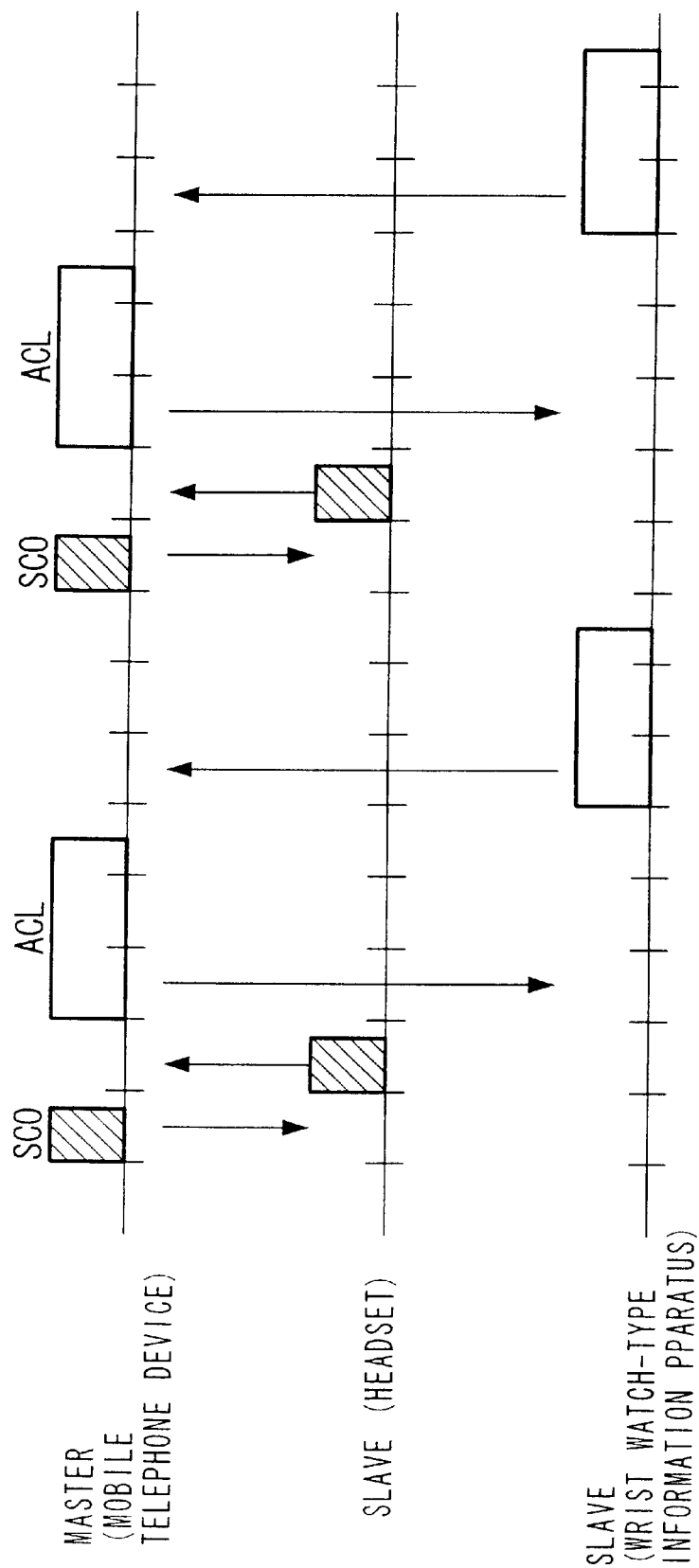
FIG. 14 is a time chart showing the manner in which packets are transferred according to the same embodiment.

Once the SCO link with the headset 13 and the ACL link with the wrist watch-type information apparatus 12B are established, the mobile telephone device 11B, the master, as shown in FIG. 14, can transmit and receive SCO packets to and from the headset 13, a slave, while at the same time transmitting and receiving ACL packets to and from the wrist watch-type information apparatus 12B, another slave.

In the bluetooth communication, the master can establish the SCO link with a maximum of three slaves at a time. Thus, the SCO link may be established between the mobile telephone device 11B and the wrist watch-type information apparatus 12B as well as between the mobile telephone device 11B and the headset 13.

After the SCO link and the ACL link are established, the mobile telephone device 11A sends the incoming call announcing signal to the bluetooth module 22. The bluetooth module 22 transmits the SCO packet including the incoming call announcing signal to the headset 13 (step S7).

The bluetooth module 72 of the headset 13, upon receipt of the SCO packet, retrieves the incoming call announcing signal from the particular packet, and sends it to the microprocessor 73. In response, the microprocessor 73 instructs the audio reproduction unit 74 to reproduce the incoming call melody. As a result, the incoming call melody is reproduced by the audio reproduction unit 74 and output through the amplifier 80 and the speaker 79 (step S8).

The user U wearing the headset 13 (FIG. 8), taking note of the incoming call melody, operates the operating unit 46 of the wrist watch-type information apparatus 12A and inputs an instruction to respond to the incoming call. The watch CPU 43B, upon receipt of this instruction through the operating unit 46 (step S9), sends the incoming call response command to the bluetooth module 42B. The bluetooth module 42B generates an ACL packet including the incoming call response command and transmits it to the mobile telephone device 11B (step S10).

The bluetooth module 42B of the mobile telephone device 11B, upon receipt of the ACL packet, retrieves the incoming call response command from it, and sends it to the microprocessor 23B. The microprocessor 23B, upon receipt of the incoming call response command, transmits the incoming call response signal to the W-CDMA baseband processing unit and the RF unit 27 (step S11). This incoming call response signal is sent to the telephone set of the calling party through the base station 14 of the mobile communication network (step S12). As a result, the line connection is completed between the telephone set of the calling party and the mobile telephone device 11B. After that, the bi-directional data communication is carried out between the two telephone sets (steps S13, S14, S15 and S16). In FIG. 12B, steps S13 and S14 represent all the data transmission from the calling party to the mobile telephone device 11B in the bi-directional data communication, while steps S15 and S16 represent all the data transmission from the mobile telephone device 11B to the calling party.

In this bi-directional data communication, upon receipt of the voice data from the calling party, the microprocessor 23B of the mobile telephone device 11B sends to the bluetooth module 22 an instruction to transmit packets to the headset 13. Then, a series of voice data received from the calling party are sent to the bluetooth module 22. The bluetooth module 22 places on the SCO packets the voice data received from the calling party, and transmits them to the headset 13 (step S21).

The bluetooth module 72 of the headset 13, upon receipt of the SCO packet from the mobile telephone device 11B, retrieves the voice data from the SCO packet and sends it to the voice CODEC 76. The voice CODEC 76 generates an analog voice signal from the voice data, and sends it to the speaker 79 through the amplifier 80. As a result, the voice of the calling party is output from the speaker 79 (step S22).

The user U wearing the headset 13 as shown in FIG. 8 can hear the voice of the calling party produced from the speaker 79. When the user utters a voice, the voice data corresponding to the particular voice is output from the voice CODEC 76. This voice data is sent to the bluetooth module 76 under the control of the microprocessor 73. The SCO packet including the voice data is transmitted to the mobile telephone device 11B by the bluetooth module 72 (step S23).

The bluetooth module 22 of the mobile telephone device 11B, upon receipt of the SCO packet, retrieves the voice data from the SCO packet (step S24). This voice data is transmitted through the W-CDMA baseband processing unit 28 and the RF unit 27 under the control of the microprocessor 23B, and sent to the calling party through the base station 14 and the mobile communication network (steps S15 and S16).

Upon receipt of the coded image data from the calling party in the bi-directional data communication (steps S13 and S14), on the other hand, the microprocessor 23B of the mobile telephone device 11B sends to the bluetooth module 22 an instruction to transmit the packet to the wrist watch-type information apparatus 12B, and then sends the coded image data received from the calling party, to the bluetooth module 22. The bluetooth module 22 places the coded image data from the calling party on the ACL packet and transmits it to the wrist watch-type information apparatus 12B (step S31).

The bluetooth module 42B of the wrist watch-type information apparatus 12B, on the other hand, upon receipt of the ACL packet from the mobile telephone device 11B, retrieves the coded image data from the ACL packet. Under the control of the watch CPU 43B, the MPEG video CODEC 51 decodes the coded image data to generate the image data. The LCD driver 45 drives the LCD 44 using this image data. As a result, the image sent from the calling party is displayed on the LCD 44 (step S32).

The user U, watching the display screen of the wrist watch-type information apparatus 11B in a posture as shown in FIG. 8, can check the image sent from the calling party.

The user U desirous of sending the image of his face to the calling party, as shown in FIG. 8, places his face in opposed relation to the imaging surface of the CMOS image sensor 48 of the wrist watch-type information apparatus 12B. As a result, the face of the user U is output as an image signal from the CMOS image sensor 48. The coded image data is generated from this image signal by the image processing unit 49 and the MPEG video CODEC 51. This coded image data is sent to the bluetooth module 42B under the control of the watch CPU 43B, and placed on the ACL packet, sent to the mobile telephone device 11B (step S33).

The bluetooth module 22 of the mobile telephone device 11B, on the other hand, upon receipt of the ACL packet, retrieves the coded image data from the ACL packet (step S34). This coded image data is transmitted through the W-CDMA baseband processing unit 28 and the RF unit 27 under the control of the microprocessor 23B, and sent to the calling party through the base station 14 and the mobile network (steps S15 and S16).

[3.2.2] Music Reproduction Operation

According to this embodiment, the user U can send the music information acquired by the mobile telephone device 11B to the headset 13 and can enjoy the music through the headset 13. This operation will be explained below.

First, the user U calls the desired contents server by the mobile telephone device 11B. When the mobile telephone device 11B and the contents server are connected to each other in response to this call, the user U requests the contents server for the audio data on the desired music through the mobile telephone device 11B. As a result, the contents including the audio data of MP3 format and the title of the music are transmitted from the contents server to the mobile telephone device 11B. This transmission data, upon receipt by the RF unit 27 of the mobile telephone device 11B, is sent through the W-CDMA baseband processing unit 28 to the bluetooth module 22 under the control of the microprocessor 23B, and placed on a plurality of SCO packets, transmitted to the headset 13.

The bluetooth module 72 of the headset 13, upon receipt of the SCO packets, retrieves the data from the SCO packets making up the contents under the control of the microprocessor 73. The microprocessor 73 assigns the music numbers to the contents. Thus, the numbers and the titles of the music are set in correspondence with the contents, and written in the memory 75 through the audio reproduction unit 74. Also, the microprocessor 73 sends the prevailing information on the list of the contents (specifically, the list of the titles and the numbers of the music in the contents) in the memory 75 to the bluetooth module 72 each time new contents are written in the memory 75 or part of the contents in the memory 75 is erased. The bluetooth module 72 places the list information on SCO packets and transmits them to the mobile telephone device 11B. The mobile telephone device 11B, placing the list information on the ACL packets, transfers them to the wrist watch-type information apparatus 12B. The watch CPU 43B of the wrist watch-type information apparatus 12B, upon receipt of the list information by the bluetooth module 42B, stores the list information in the nonvolatile memory 57.

After that, the user U operates the operating switch unit 4 of the wrist watch-type information apparatus 12B and gives an instruction to reproduce music. Then, the watch CPU 43B sends the list information in the nonvolatile memory 57 to the LCD driver 45. As a result, the titles and the number of the music in the respective contents stored in the memory 75 of the headset 13 are displayed on the LCD 44. When the user U selects the music number of the desired contents by operating the operating switch unit 46, the input interface unit 47 generates an instruction data for music reproduction and sends it to the watch CPU 43B. The instruction data includes the music number selected by the user U. The watch CPU 43B instructs the bluetooth module 42 to transmit the instruction data to the mobile telephone device 11B. In accordance with this instruction, the bluetooth module 42B transmits the ACL packet including the instruction data to the mobile telephone device 11B.

The bluetooth module 22 of the mobile telephone device 11B, upon receipt of the ACL packet, retrieves the instruction data from the ACL packet and sends it to the microprocessor 23B. The microprocessor 23B, checking that the instruction data is the one for music reproduction, instructs the the bluetooth module 22 to transfer the instruction data to the headset 13. The bluetooth module 22 transmits the SCO packet including the instruction data to the headset 13.

This SCO packet is received by the bluetooth module 72 of the headset 13. The bluetooth module 72 retrieves the instruction data from the SCO packet and sends it to the microprocessor 73. The microprocessor 73, checking that the instruction data is for music reproduction, instructs the audio reproduction unit 74 to reproduce the music of the contents corresponding to the music number included in the instruction data. In response to the instruction, the audio reproduction unit 74 reads the corresponding contents from the memory 75, demodulates the music signal from the audio data of the contents, and outputs the music signal to the amplifier 80. The amplifier 80 amplifies and outputs the music signal from the speaker 79.

In parallel with the music reproduction, the audio reproduction unit 74 outputs to the bluetooth module 72 the reproduction condition data indicating the title and the number of the music, the time elapsed by the music, the reproduction time for all the music to be reproduced, and the remaining reproduction time for all the music to be reproduced. The bluetooth module 72 transmits the SCO packets including the reproduction condition data to the mobile telephone device 11B.

The reproduction condition data are transferred to the wrist watch-type information apparatus 12B by the mobile telephone device 11. In the wrist watch-type information apparatus 12B, the reproduction condition data are sent to the LCD driver 45, and the information including the title and the number of the music in reproduction, the time elapsed by the music, the reproduction time for all the music to be reproduced, and the remaining reproduction time for all the music to be reproduced are displayed on the LCD 44.

[3.2.3] Access to WWW Server Through Mobile Telephone Device

According to this embodiment, the user U, when not making speech, can cause the mobile telephone device 11B to access the WWW (world wide web) server by operating the wrist watch-type information apparatus 12B. This operation will be explained below.

Figure 15:
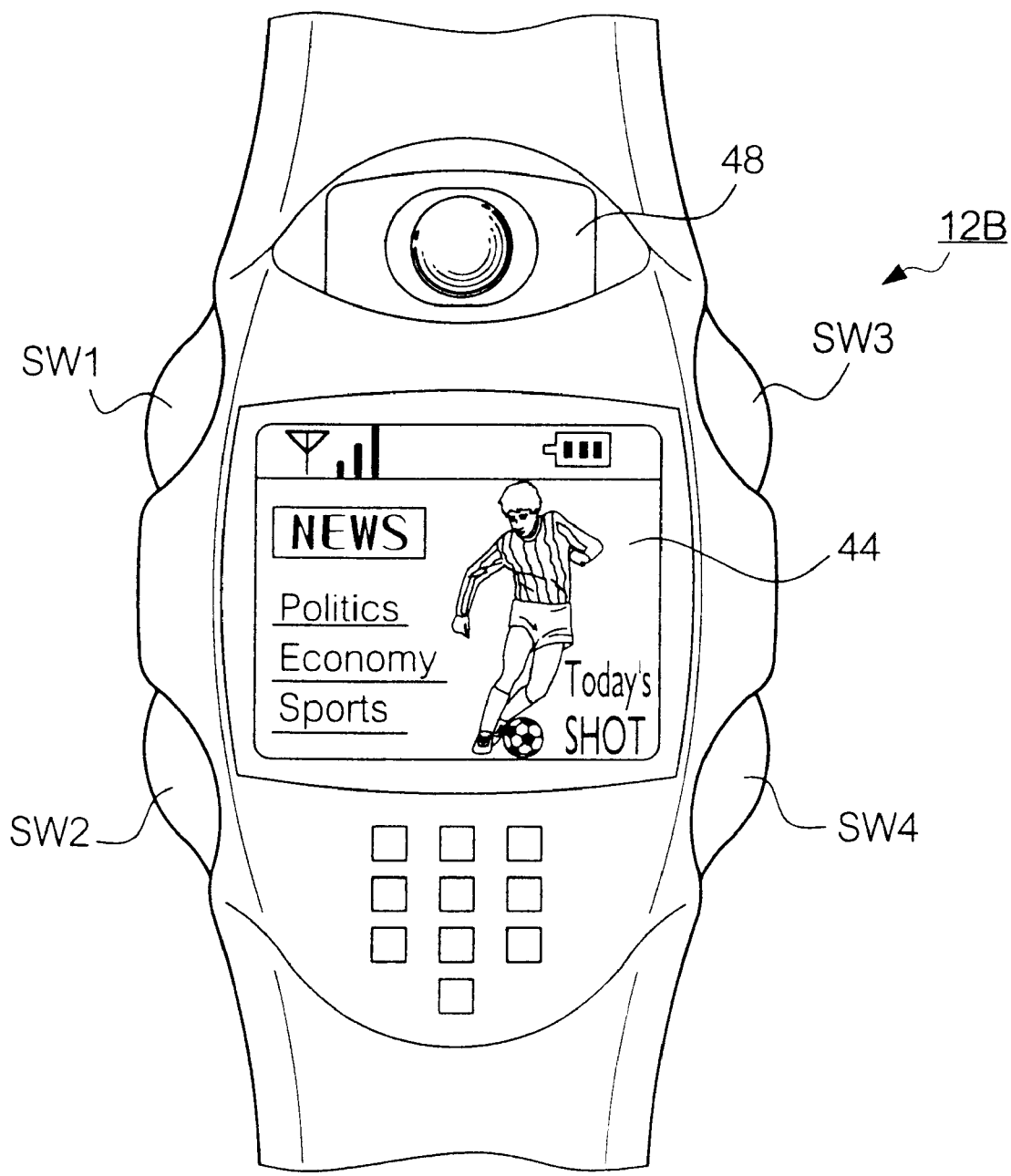
FIG. 15 is a diagram showing an example of display on the wrist watch-type information apparatus according to the same embodiment.

When the user U gives an instruction for access to the desired WWW server by operating the operating switch 46 of the wrist watch-type information apparatus 12B, the watch CPU 43B transmits the access instruction to the mobile telephone device 11B by the bluetooth module 42. The mobile telephone device 11B, in response to the access instruction, connects the WWW server desired by the user U. With the arrival of the HTML (HiperText Markup Language) data of the home page from the WWW server, the mobile telephone device 11B transmits the HTML data to the wrist watch-type information apparatus 12B by the bluetooth module 22. Also, in the case where there occurs any change in the information including the receiving level of the RF unit 27, the remaining battery capacity, etc. displayed on the LCD 24 of the mobile telephone device 11B, the microprocessor 23B of the mobile telephone device 11B transmits the information displayed after the change to the wrist watch-type information apparatus 12B by the bluetooth module 22. The information displayed includes the receiving level of the RF unit 27, the remaining battery capacity and the currently set mode. The watch CPU 43B of the wrist watch-type information apparatus 12B synthesizes the display data from the displayed information of the wrist watch-type information apparatus 11B and the HTML data of the home page sent this way, and sends the synthesized data to the LCD driver 45. As a result, as shown in FIG. 15, the same information as the one displayed on the LCD 24 of the mobile telephone device 11B accessing the WWW server is displayed on the LCD 44 of the wrist watch-type information apparatus 12B. Thus, the user can access the desired site by remote control operation of the mobile telephone device 11B by the wrist watch-type information apparatus 12B. At the same time, the user U can check the receiving level and remaining battery capacity of the mobile telephone device 11B by the display on the LCD 44 of the wrist watch-type information apparatus 12B.

[3.3] Effects of Third Embodiment

As described above, according to the third embodiment, the user can establish the videophone communication with a third party using the headset as a means for voice conversation and the wrist watch-type information apparatus as a means for image communication while keeping the mobile telephone device in the bag.

[3.4] Modifications of Third Embodiment

[3.4.1] First Modification

According to the embodiment described above, the instruction for incoming call response is given by operating the operating switch unit of the wrist watch-type information apparatus. It is possible, however, to provide the headset or the mobile telephone device with a voice recognition circuit for recognizing the voice input from the microphone of the headset so that a response is made to an incoming call when a given voice is recognized. According to this modification, the hand-free communication can be realized while displaying various information on the wrist watch-type information apparatus.

[3.4.2] Second Modification

This modification assumes the case in which the mobile telephone device has the functions of receiving electric mails and displaying a home page. In this modification, the mobile telephone device transfers the electric mail data or the home page to the wrist watch-type information apparatus at the time of arrival of an electric mail or at the time of setting the home page in automatic cycles. The wrist watch-type information apparatus displays the transfer data. According to this modification, the electric mail can be read or the home page can be accessed without taking out the mobile telephone device from the bag. Also, the mobile telephone device may be provided with a voice synthesis circuit for converting the text data in the received electric mail to the voice data so that the voice data obtained from the voice synthesis circuit may be transferred to the headset. This modification make it possible for the user to hear the contents of the electric mail by way of the headset.

4 Common Modification of Embodiments

[4.1] First Modification

Each of the embodiments described above employs the bluetooth communication as a local bi-directional radio communication, to which the invention is not limited. Instead, various radio communication using the radio wave can be used.

[4.2] Second Modification

In each of the embodiments described above, the wrist watch-type information apparatus is used as a wearable radio communication device. Nevertheless, those skilled in the art can modify the embodiments to configure various wearable radio communication devices such as a finger ring type, a ring type, necklace type or pendant type which can be worn by the user.

[4.3] Third Modification

The foregoing description refers to the reproduction of the music data as digital recording data. The invention, however, is not limited to the sing and music performance, but can be configured to reproduce various audio data including natural and synthesized sounds as well as the conversation for learning a language, chirping of birds or murmuring of little streams.

The data can be digitally recorded in such formats as ATRAC3, SoundVQ or other various formats for music data compression or MIDI as well as MP3 format described in the embodiments above.

What is claimed is:

1. A headset comprising:

a memory for storing music information;

an audio reproduction unit for reproducing the music information stored in said memory and outputting said music information as a sound;

a local radio communication unit for effecting local bi-directional radio communication with a mobile telephone device capable of effecting the local bi-directional radio communication, using identification of the other party, with a wearable radio communication device; and a control unit for causing said local radio communication unit to receive an instruction signal from said mobile telephone device and instructing said audio reproduction unit to reproduce the music information stored in said memory, in accordance with the instruction signal received from said wearable radio communication device through said mobile telephone device.

2. A headset according to claim 1, wherein said memory is a semiconductor memory removable from said headset.

3. A mobile system comprising a mobile telephone device, a wearable radio communication device, and a headset, wherein said mobile telephone device includes:

a communication unit, a first local radio communication unit for effecting local bi-directional radio communication with said wearable radio communication device and said headset by identifying the other party, and a first control unit for establishing a first communication link for effecting local radio communication with said wearable radio communication device and establishing a second communication link for effecting local radio communication with said headset by said first local radio communication unit in response to the arrival of an incoming call, and operating upon receipt of an instruction through said first communication link from said wearable radio communication device;

wherein said wearable radio communication device includes a second local radio communication unit for effecting local bi-directional radio communication with said mobile telephone device by identifying the other party; and wherein said headset includes:

a third local radio communication unit for effecting bi-directional radio communication with said mobile telephone device by identifying the other party, a voice input/output unit, and a second control unit for causing the voice received from said mobile telephone device by said third local radio communication unit to be output by said voice input/output unit, and for causing the voice input through said voice input/output unit to be transmitted to said mobile telephone device by said third local radio communication unit.

4. A mobile system according to claim 3, wherein said first control unit of said mobile telephone device comprises means for causing said communication unit to effect image and voice communication with the other party through the network, causing the voice received from the other party to be transmitted to said headset by said first local radio communication unit, causing the voice received from said headset by said first local radio communication unit to be transmitted to the other party by said communication unit, causing the image received from the other party to be transmitted to said wearable radio communication device by said first local radio communication unit, and causing the image received from said wearable radio communication device by said first local radio communication unit to be transmitted to the other party; and wherein said wearable radio communication device further comprises:

an imaging unit, a display unit, and a third control unit for causing the image received from said mobile telephone device by said second local radio communication unit to be displayed on said display unit, and for causing the image obtained by said imaging unit to be transmitted to said mobile telephone device by said second local radio communication unit.

5. A mobile system according to claim 3, wherein said wearable radio communication device further comprises means for transmitting an incoming call response instruction to said mobile telephone device by said second local radio communication unit; and wherein said first control unit of said mobile telephone device further comprises means for establishing a communication line with the other party through a network upon receipt of the incoming call response instruction from said wearable radio communication device.

6. A mobile system according to claim 3, wherein said first control unit of said mobile telephone device has a repeating function whereby the information received from said wearable radio communication device through said first communication link is transmitted to said headset through said second communication link, and wherein said wearable radio communication device transmits an instruction signal, for controlling said headset, to said headset through said first communication link and said second communication link utilizing said repeating function.

7. A communication method that includes the use of a mobile telephone device, a wearable radio communication unit having an imaging unit and a display unit, and a headset having a voice input/output unit, the method comprising the steps of:

establishing by said mobile telephone device a first communication link for effecting local radio communication with said wearable radio communication device and establishing a second communication link for effecting local radio communication with said headset in response to the arrival of an incoming call to said mobile telephone device; and effecting image and voice communication with the other party through a network using said mobile telephone device, wherein the voice received from the other party is transmitted to said headset by local radio communication using identification of the other party, the voice is received from said headset by local radio communication and transmitted to the other party using identification of the other party, the image received from the other party is transmitted to said wearable radio communication unit by local radio communication using identification of the other party, and the image is received by local radio communication from said wearable radio communication device and transmitted to the other party using identification of the other party;

wherein said wearable radio communication device is such that an image is received from said mobile telephone device by local radio communication using identification of the other party and displayed on said display unit, and an image is picked up by said imaging unit and transmitted to said mobile telephone device by local radio communication using identification of the other party; and wherein said headset is such that a voice is received from said mobile telephone device by local radio communication using identification of the other party and output from said voice input/output unit, and the voice input through said voice input/output unit is transmitted to said mobile telephone device by local radio communication using identification of the other party.

8. A communication method according to claim 7, further comprising the steps of:

transmitting an incoming call response instruction from said wearable radio communication device through said first communication link to said mobile telephone device; and establishing a communication line with the other party through the network upon receipt of the incoming call response instruction from said wearable radio communication device.

9. A communication method according to claim 8, wherein an incoming call arrival announcing signal is sent to said headset through said second communication link in response to the arrival of the incoming call.

10. A mobile telephone device comprising:

a communication unit;

a local radio communication unit for effecting local bi-directional radio communication using identification of the other party with a wearable radio communication device and a headset; and a control unit for establishing a first communication link for effecting local radio communication with said wearable radio communication device and establishing a second communication link for effecting local radio communication with said headset by said local radio communication unit in response to the arrival of an incoming call.

11. A mobile telephone device according to claim 10, wherein said control unit further comprises:

means for establishing a communication line with the other party through a network upon receipt of an incoming call response instruction through said first communication link from said wearable radio communication device; and means for causing said communication unit to effect image and voice communication with the other party through the network, causing the voice received from the other party to be transmitted to said headset by said local radio communication unit, causing the voice received from said headset by said local communication unit to be transmitted to the other party by said communication unit, causing the image received from the other party to be transmitted to said wearable radio communication device by said local radio communication unit, and causing the image received from said wearable radio communication device by said local radio communication unit to be transmitted to the other party by said communication unit.

12. A mobile telephone device according to claim 11, wherein said control unit further comprises means for sending an incoming call arrival announcing signal to said headset through said second communication link in response to the arrival of the incoming call.

13. A mobile telephone device according to claim 10, wherein said control unit has a first repeating function whereby the information received from said wearable radio communication device through said first communication link is transmitted to said headset through said second communication link, and wherein said wearable radio communication device transmits an instruction signal, for controlling said headset, to said headset through said first communication link and said second communication link utilizing said first repeating function.

14. A mobile telephone device according to claim 13, wherein said control unit further has a second repeating function whereby the information received from said headset through said second communication link is transmitted to said wearable radio communication device through said first communication link, and wherein said control unit receives the information through said second communication link and said first communication link from said headset utilizing said second repeating function.

15. A wearable radio communication device comprising:

an imaging unit;

a display unit;

a local radio communication unit for effecting local bi-directional radio communication using identification of the other party with a mobile telephone device capable of establishing a first communication link for local bi-directional radio communication with said wearable radio communication device and a second communication link for local bi-directional radio communication with a headset having a voice input/output unit, and for effecting the local bi-directional radio communication including the voice data communication through said first communication link; and a control unit for causing the image received from said mobile telephone device by said local radio communication unit to be displayed on said display unit, causing the image obtained by said imaging unit to be transmitted to said mobile telephone device by said local radio communication unit, and causing an instruction signal for controlling said mobile telephone device to be transmitted by said local radio communication unit;

wherein said mobile telephone device has a first repeating function whereby the information received from said wearable radio communication device through said first communication link is transmitted to said headset through said second communication link, and said control unit transmits an instruction signal for controlling said headset, to said headset through said first communication link and said second communication link utilizing said first repeating function.

16. A wearable radio communication device according to claim 15, wherein said headset includes a memory for storing the voice data and an audio reproduction unit for performing the audio reproduction processing by reading said voice data from said memory and outputting said voice data as a sound from said voice input/output unit, and said control unit transmits to said headset an instruction signal giving an instruction to execute said audio reproduction processing.

17. A wearable radio communication device according to claim 15, wherein said mobile telephone device has a second repeating function whereby the information received from said headset through said second communication link is transmitted to said wearable radio communication device through said first communication link, and said control unit receives the information through said second communication link and said first communication link from said headset utilizing said second repeating function.

18. A wearable radio communication device according to claim 17, wherein said headset includes a memory for storing the voice data, an audio reproduction unit for performing the audio reproduction processing by reading said voice data from said memory and outputting said voice data as a sound from said voice input/output unit, and a device for outputting a list of the information stored in said memory, said wearable radio communication device further comprising an operating unit, said control unit being such that the list of the information stored in said memory is received from said headset and displayed on said display unit and the instruction signal for giving an instruction given by the operation of said operating unit for performing the audio reproduction processing for the voice data is transmitted to said headset.

19. A wearable radio communication device according to claim 15, said wearable radio communication device being in the shape of a wrist watch wearable on the wrist of the user and having a clocking function, and wherein, when the information obtained by communication is not displayed on said display unit, displays the present time on said display unit.

20. A communication method that includes the use of a mobile telephone device, a wearable radio communication unit having a display unit, and a headset having a voice input/output unit, the method comprising the steps of:

establishing by said mobile telephone device a first communication link for effecting local radio communication with said wearable radio communication unit and a second communication link for effecting local radio communication with said headset in response to the arrival of an incoming call to said mobile telephone device; and effecting image and voice communication with the other party through a network using said mobile telephone device, wherein the voice received from the other party is transmitted to said headset by local radio communication using identification of the other party, the voice is received from said headset by local radio communication and transmitted to the other party using identification of the other party, and the image received from the other party is transmitted to said wearable radio communication unit by local radio communication using identification of the other party, wherein said wearable radio communication unit is such that an image is received from said mobile telephone device by local radio communication using identification of the other party and displayed on said display unit, and wherein said headset is such that a voice is received from said mobile telephone device by local radio communication using identification of the other party and output from said voice input/output unit, and the voice input through said voice input/output unit is transmitted to said mobile telephone device by local radio communication using identification of the other party.

21. A wearable radio communication device comprising:

a display unit;

a local radio communication unit for effecting local bi-directional radio communication using identification of the other party with a mobile telephone device capable of establishing a first communication link for local bi-directional radio communication with a wearable radio communication device and a second communication link for local bi-directional radio communication with a headset having a voice input/output unit, and of effecting the local bi-directional radio communication including the voice data communication through said first communication link; and a control unit for causing the image received from said mobile telephone device by said local radio communication unit to be displayed on said display unit, and causing an instruction signal for controlling said mobile telephone device to be transmitted by said local radio communication unit, wherein said mobile telephone device has a first repeating function whereby the information received from said wearable radio communication device through said first communication link is transmitted to said headset through said second communication link, and said control unit transmits an instruction signal for controlling said headset, to said headset through said first communication link, said second communication link utilizing said first repeating function.

22. A communication method that includes the use of a mobile telephone device, a wearable radio communication unit, and a headset having a voice input/output unit, the method comprising the steps of:

establishing by said mobile telephone device a first communication link for effecting local radio communication with said wearable radio communication unit and a second communication link for effecting local radio communication with said headset in response to the arrival of an incoming call to said mobile telephone device; and effecting voice communication with the other party through a network using said mobile telephone device, wherein the voice received from the other party is transmitted to said headset by local radio communication using identification of the other party, the voice is received from said headset by local radio communication and transmitted to the other party using identification of the other party, wherein said headset is such that a voice is received from said mobile telephone device by local radio communication using identification of the other party and output from said voice input/output unit, and the voice input through said voice input/output unit is transmitted to said mobile telephone device by local radio communication using identification of the other party.

23. A wearable radio communication device comprising:

a local radio communication unit for effecting local bi-directional radio communication using identification of the other party with a mobile telephone device capable of establishing a first communication link for local bi-directional radio communication with a wearable radio communication device and a second communication link for local bi-directional radio communication with a headset having a voice input/output unit, and of effecting the local bi-directional radio communication including the voice data communication through said first communication link; and a control unit for causing an instruction signal for controlling said mobile telephone device to be transmitted by said local radio communication unit, wherein said mobile telephone device has a first repeating function whereby the information received from said wearable radio communication device through said first communication link is transmitted to said headset through said second communication link, and said control unit transmits an instruction signal for controlling said headset, to said headset through said first communication link, said second communication link utilizing said first repeating function.

* * * * *